US008082196B2

(12) United States Patent
Mullan et al.

(10) Patent No.: US 8,082,196 B2
(45) Date of Patent: Dec. 20, 2011

(54) FINANCIAL MANAGEMENT SYSTEM, AND METHODS AND APPARATUS FOR USE THEREIN

(75) Inventors: Anthony John Mullan, Norwich (GB); Richard Jeremy Heap, Norfolk (GB)

(73) Assignee: The One Account Limited, Norwich (GB)

( * ) Notice: Subject to any disclaimer, the term of this patent is extended or adjusted under 35 U.S.C. 154(b) by 2588 days.

(21) Appl. No.: 10/154,441

(22) Filed: May 24, 2002

(65) Prior Publication Data

US 2003/0009402 A1 Jan. 9, 2003

(30) Foreign Application Priority Data

May 24, 2001 (GB) .................................. 0112596.2

(51) Int. Cl.
*G06Q 40/00* (2006.01)
(52) U.S. Cl. .......................................... 705/35; 705/39
(58) Field of Classification Search .................. 705/35, 705/39
See application file for complete search history.

(56) References Cited

U.S. PATENT DOCUMENTS

| | | | | | |
|---|---|---|---|---|---|
| 5,866,889 | A | * | 2/1999 | Weiss et al. | 235/379 |
| 6,131,810 | A | * | 10/2000 | Weiss et al. | 235/379 |
| 7,542,935 | B2 | * | 6/2009 | Fuentes-Torres | 705/35 |
| 2002/0035527 | A1 | * | 3/2002 | Corrin | 705/35 |
| 2002/0147668 | A1 | * | 10/2002 | Smith et al. | 705/30 |
| 2004/0039701 | A1 | * | 2/2004 | Nakamura et al. | 705/42 |
| 2007/0250442 | A1 | * | 10/2007 | Hogan et al. | 705/41 |

* cited by examiner

*Primary Examiner* — Lindsay M. Maguire
(74) *Attorney, Agent, or Firm* — Prakash Nama; Global IP Services, PLLC

(57) ABSTRACT

The invention provides a financial management system wherein a real bank account is notionally sub-divided into virtual sub-accounts and transactions are effected between the virtual sub-accounts without affecting the operation of the real bank account, such a system allowing a customer to maintain an automatically updated model of the customer's finances within the single account, thus assisting visualization of his or her financial position, while retaining the benefit of the single account.

21 Claims, 21 Drawing Sheets

FIG. 11

As at 7th August 2000

| SUMMARY | CURRENT | MORTGAGE | SAVINGS | LOANS |
|---|---|---|---|---|

Account Transactions

| Date | Type | Description | Paymen | Income |
|---|---|---|---|---|
| 4/8/200 | DEB | GROCERIES | £50.00 | |
| | | Totals | £50.00 | |

Anticipated Transactions

| Type | Date | Description | Category | Amount |
|---|---|---|---|---|
| | | | | |
| | | | | |
| | | | | |
| | | | Total | |

CREATE

| CALCULATOR | CALENDAR | TRANSFER | MESSAGES | WHAT IF I... |
|---|---|---|---|---|

FIG. 12

| SUMMARY | CURRENT | MORTGAGE | SAVINGS | LOANS |
|---|---|---|---|---|

As at 7th August 2000

AUGUST 2000

|  |  |  |  |  |
|---|---|---|---|---|
| 1 | 2 | 3 | 4 | 5 |
| 6 | 7 You have transactions! Free Cash £ | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 |  |  |  |  |

New Entry    Delete Entry    Close

| CALCULATOR | CALENDAR | TRANSFER | MESSAGES | WHAT IF I... |
|---|---|---|---|---|

FIG. 17

FINANCIAL MANAGEMENT SYSTEM, AND METHODS AND APPARATUS FOR USE THEREIN

RELATED APPLICATIONS

Benefit is claimed under 35 U.S.C. 119(a)-(d) to Foreign application Serial No. 0112596.2 entitled "Financial management system, and methods and apparatus for use therein" by THE ONE ACCOUNT LIMITED, filed on 24th May, 2001, in United Kingdom which is herein incorporated in its entirety by reference for all purposes.

The present invention relates to financial management systems, in particular ones which provide a versatile virtually structured personal bank account. More specifically, the present invention relates to apparatus and methods for providing an integrated banking account where only one actual financial account is held but which is represented as different virtual sub-accounts according to user-defined parameters. The invention further relates to a set of computer-implemented process steps suitable for implementing such an apparatus or method when installed on a customer's or a service provider's computers.

One of the traditional approaches to personal financial management has been to allocate different accounts for different purposes. For example, borrowing and saving in different accounts. An individual's income may be paid into a general purpose account such as a current account ("checking" account in US terminology) and separate accounts kept for loans such as mortgages. Credit cards traditionally also have separate accounts according to which provider issues them. Savings accounts are also traditionally held separately from other accounts.

There are drawbacks in having separate accounts. General purpose accounts generally pay low rates of interest whereas in contrast higher interest-bearing accounts may oblige the account holder to commit large sums of money or restrict access to funds. Mortgage accounts can be inflexible regarding repayment schedules and amounts. Additionally, if an individual has several accounts it can be difficult to manage and track transactions and total expenditure. This approach to account structure is still evident in modem financial services accessible remotely, such as telephone and Internet banking.

Integrated financial products have become known which offer a single account on which all financial services are based. This typically takes the form of a single mortgage-based account, where only a single rate of interest is applicable. All credits and debits are made to and from this account, thereby combining, for example, a mortgage with salary and savings payments into the account together with personal loan and credit card payments out of the account.

One such financial management system is the Virgin One® account available in the United Kingdom from Virgin Direct Personal Finance Limited which provides a single mortgage-based account of the type described above. Virgin One is a registered trade mark of Virgin Enterprises Limited. One Account™ is a trade mark of Virgin Direct Personal Finance Limited. A borrowing limit termed the "facility" and based on the value of the mortgage sets the limit up to which a customer may borrow money. Such an account greatly simplifies money management matters as all real credits and debits relate to the same account on which a single rate of interest applies. Interest is only paid on the net amount borrowed, instead of the conventional situation in which a customer pays interest on a mortgage while simultaneously earning a different (lower) amount of interest on savings, even with the same institution. There is internet access for the account where an individual can access account details remotely and view account details as well as instructing transactions of various types.

However, although such single accounts offer the aforementioned advantages it may be desired to track financial information on a more detailed level to examine credits and/or debits relating to a specific category of financial activity, for example what portion of income is being directed towards mortgage payments, or what amount of money is available for spending.

It would be advantageous to provide means to control and budget such an account more effectively. Historically customers have been left to their own devices when it has come to budgeting. Although in the Virgin One account a customer can track their net balance against a "target" curve which is calculated to pay off the mortgage within a desired term, existing services do not currently provide any more detailed methods whereby a customer can see their exact financial position at any point in time and understand exactly how much money they have to spend in view of other commitments. Similarly, it may be difficult for a customer of such an account to see the effect of any "savings" and "loans" which they may have, as these are held in the account as a single sum. It would also be beneficial to account customers if they could not only track detailed financial information as a past history but to analyse and forecast what would happen to their finances in the future.

It has been recognised by the inventors that it would be advantageous to have a financial product which operates as a single account, with all the benefits such an account structure brings, but also to provide an improved system and method for the customer's own management of such an account. Further, it has been recognised as being advantageous to provide such financial services remotely, for example as part of an internet based bank account, and to provide a high degree of user definition of how financial information is presented.

It is an object of the present invention to provide an improved financial management system for remotely accessible banking services.

It is a further object of the present invention to provide a financial management system enabling the creation and management of user defined virtual sub-accounts for a remotely accessible single banking account.

It is a further object of the present invention to provide for a tool for the live on-line forecasting of financial trends in a traditional banking account.

The invention in a first aspect provides a financial management system, wherein a real bank account is notionally subdivided into at least two virtual sub-accounts and transactions may be effected between said virtual sub-accounts without affecting the operation of the real bank account. Such a system allows a customer to maintain an automatically updated model of the customer's finances within the single account, to assist visualisation of his or her financial position, while retaining the benefit of the single account.

The virtual-sub accounts may be created with predefined attributes or user defined attributes.

Transactions relating to the parent account may be categorised and traced by a virtual account.

The virtual-sub accounts may also be categorised according to use. It is further possible to create sub-categories within a category.

For example, a virtual sub-account may be assigned "savings" category so that all transactions for the parent account which have been labelled as "savings" will apply to that virtual sub-account.

The financial management system may be operable to trace and summarise real and virtual transactions according to category and other attributes.

The invention in one particular embodiment provides a financial management system comprising account operation apparatus, arranged to implement integrated bank accounts for a plurality of customers, each integrated bank account combining the features of (i) a loan secured against an asset of the customer and (ii) a current account, whereby the customer's day-to-day credit and debit transactions are aggregated with the loan into a single account balance, said account operation apparatus comprising:

real transaction means for receiving from the customer instructions for credit and debit transactions and for effecting said transactions by communication with apparatuses of a plurality of banking institutions;

accounting means for periodically updating said single account balance, interest deductions and available credit in response to said real transactions; and primary reporting means for reporting to the customer the single account balance and transaction history, the apparatus further comprising secondary customer interface means for use in financial planning comprising:

sub-account creating means responsive to secondary customer instructions for creating a sub-account database defining attributes and virtual balances for a plurality of virtual sub-accounts so as to compartmentalise funds within said single account balance and credit limit without creating separate accounts in said account operation apparatus;

virtual transaction means for effecting virtual transactions between said sub-accounts without effecting any real transaction or altering the single account balance;

virtual accounting means for updating and reporting sub-account balances in response to each said virtual transaction.

The sub-accounts may include a virtual current account whose balance is said single account balance minus the other virtual sub-account balances.

The secondary customer interface means may be arranged to present all real transactions, as transactions with said virtual current account.

The real transaction means may be operable to create regular and ad hoc transactions according to said customer instructions.

The virtual transaction means may include means for generating automatic virtual transactions at intervals, in accordance with sub-account parameters defined by the secondary customer instructions.

Said sub-account creating means may be operable to create a loan-type sub-account, the virtual transaction means being arranged to generate virtual transactions automatically so as to "repay" the loan-type sub-account over a period of time.

The virtual transaction means may be operable to associate portions of the interest deductions of the single account with a loan-type sub-account, thereby to present interest deductions as virtual transactions with said sub-account.

Similarly, said sub-account creating means may be operable to create a savings-type sub-account, the virtual transaction means being arranged to generate virtual transactions automatically so as to transfer funds from another sub-account into said savings-type sub-account over a period of time.

Said virtual accounting means may be arranged to operate only in response to customer activation of said secondary customer interface means. In contrast, real transactions and accounting must be performed in real-time, and subject to the strict requirements of banking practice. The versatile financial management system can therefore be implemented far more cheaply than a correspondingly versatile system based on real accounts.

Said virtual accounting means may be arranged to update the balances of all sub-accounts before allowing access to functions for the creation and/or modification of sub-accounts.

Said virtual accounting means may include projection means for calculating and reporting projected sub-account balances at a future date, by reference to a database of expected virtual transactions. Said projection means may be operable to report on the effect of hypothetical changes in attributes of the sub-accounts.

Said account operation apparatus and said secondary customer interface apparatus may be implemented on independent computer systems.

The primary and secondary customer interface means may include means for establishing a secure connection with a customer's own terminal over a public telecommunications network.

The sub-account database may be maintained on a customer's own terminal, such as a personal computer or PDA. In a presently preferred embodiment, however, sub-account databases for said plurality of customers are maintained on a central server apparatus.

The customer's own terminal in that case merely handles instructions and reporting functions, for example by means of a graphical user interface (GUI), the virtual transactions being implemented on the sub-account database remote from the customer.

The secondary customer interface apparatus may be controlled by an intermediate service provider separate from the banking institution controlling the account operating apparatus. In this way, flexibility for the customer and the service provider can be maximised without complicating or prejudicing the integrity of the account operating apparatus.

The invention further provides a customer service apparatus comprising a data processing and communication system arranged to implement the secondary customer interface apparatus of a financial management system according to the invention as set forth above.

The invention further provides an apparatus for the creation and maintenance of a model of a single bank account in which the single account is sub-divided into virtual sub-accounts.

Said virtual sub-accounts may be created as loan-type accounts or as savings-type accounts.

Said virtual sub-accounts may have associated virtual transactions whereby parameters of said virtual sub-accounts are altered without affecting the single account balance.

Said virtual transactions between said sub-accounts may be linked to real transactions associated with the single account.

In a preferred embodiment, the customer can define the operational model parameters of said virtual sub-accounts and their associated transactions by way of a customer user interface means.

The parameters of a virtual sub-account may be modified so as to associate a particular type of transaction to that particular sub-account.

Similarly, the parameters of a virtual transaction may be modified so as to associate a particular type of sub-account to that particular transaction.

The model may include as a parameter the timeframe over which financial data relating to the virtual sub-accounts and single account is calculated.

The timeframe parameters of the model may be modified so as to produce a forecast model of the future financial position of said single account. Said forecast position can be further analysed by way of said virtual sub-accounts. Such a forecast model may be used to determine the most suitable way to allocate financial resources.

The invention in another aspect provides a method of representing a personal single banking account as a number of virtual sub-accounts wherein parameters of said sub-accounts can be modified by a customer to produce a time-dependent model of the financial position of the customer.

Said parameters of said sub-accounts may include real transactions associated with said single account, or virtual transactions between said sub-accounts.

Said method of modelling said single account may further include filtering data according to sub-account parameters to provide an analysis of financial resources.

Said analysis of financial resources may be for a historical time period so as to produce a historical analysis.

Said analysis of financial resources may be for a future time period so as to produce a forecast analysis.

The invention yet further provides computer-readable program steps on a record carrier or other form for causing a programmable data processing and communication apparatus to implement the features of said secondary customer interface means as set forth above.

The invention further provides methods of providing financial management services based on the principles of the systems set forth above.

BRIEF DESCRIPTION OF THE DRAWINGS

Embodiments of the invention will now be described, by way of example only, by reference to the accompanying drawings, in which:

FIGS. 8 to 17 show various example displays in the improved financial management system embodiment of the invention.

DETAILED DESCRIPTION OF THE EMBODIMENTS

Introduction to Integrated Accounts

Figure 1:
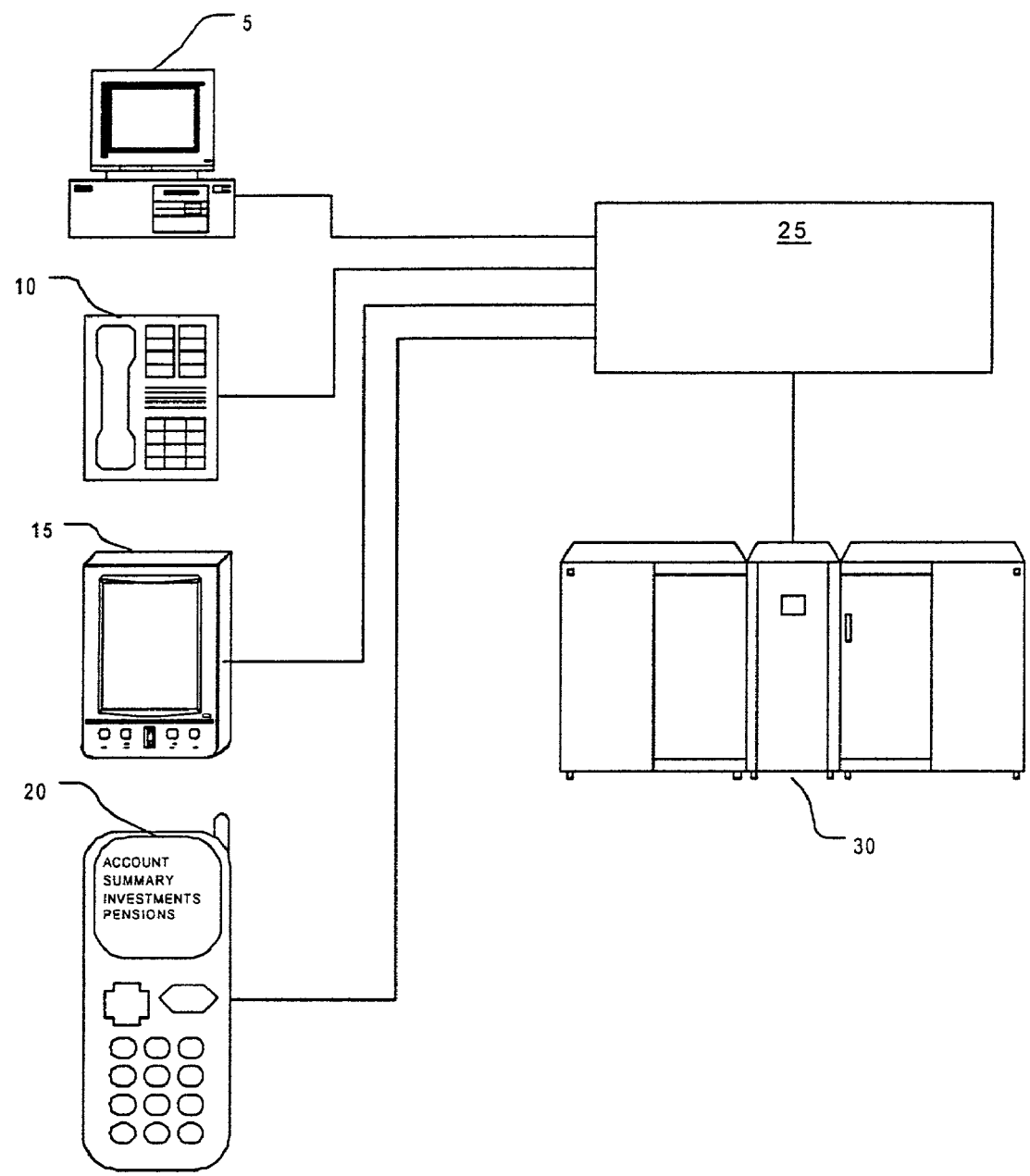
FIG. 1 shows schematically the computer and communication elements of a financial management system providing a single integrated account.

FIG. 1 shows schematically the computer and communication elements of a financial management system (apparatus) providing a remotely accessible integrated account.

In this example a customer has access to a banking account via suitable means such as the internet via a personal computer 5 (PC). Other possible means of access include by telephone 10 and other suitably enabled devices such as a personal digital assistant (PDA) 15 or a Wireless Application Protocol (WAP) mobile telephone 20. The account may be held remotely, accessible through a customer gateway and/or database 25 connecting to the computing resources 30 of a financial institution which provides the actual banking account facilities. In this example the customer database is held at one level and communicates with a separate facility which handles the actual account. In this way, if preferred, an enhanced service may be provided and administered by an intermediate institution, separate from the institution which provides the actual financial infrastructure. The customer database is a database holding the primary customer data, shared for use between these institutions. The means 5-20 for accessing the banking account are termed "channels".

The customer can remotely interrogate the system to acquire account information. Using such a service the customer can check account details such as account balance and transactions. Additionally, a customer may amend billing details from his/her account such as direct debits and standing orders.

Figure 2:
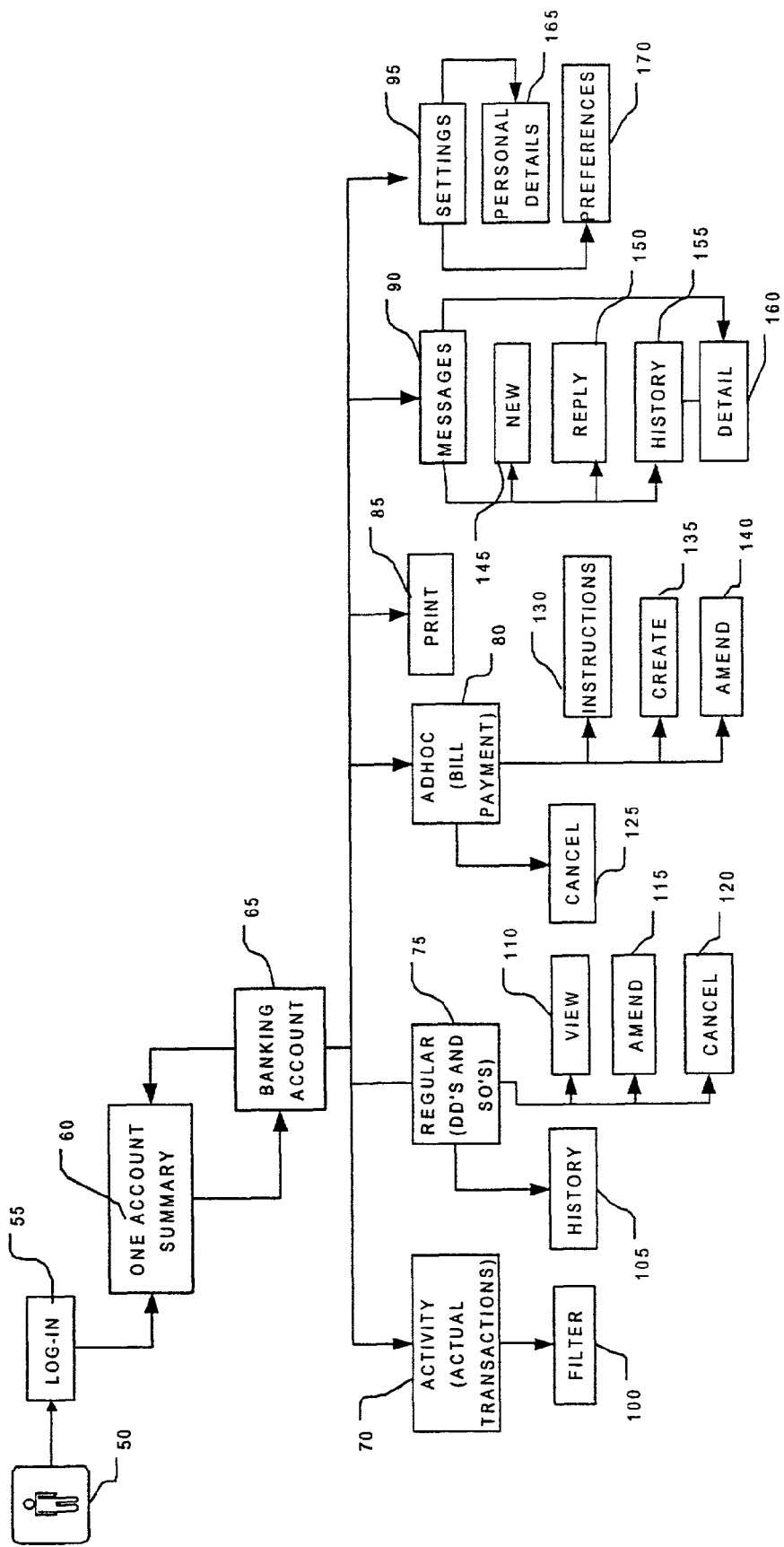
FIG. 2 illustrates the basic functional structure and user navigation arrangement for a financial management system providing a single integrated account.

FIG. 2 illustrates the basic functional structure and navigation arrangement for a financial management system providing a single integrated account. The example here is based upon one such known integrated account, the Virgin One® account, provided by Virgin Direct Personal Finance Limited as mentioned above. The following example and subsequent description of a financial management system is not intended to provide a comprehensive explanation of this account and its operation.

The integrated account is structured as a single large loan, typically based on a mortgage of property. All financial transactions are carried out through this account with a ceiling credit limit related to the mortgage, known as the "Facility". This allows for the account to operate in a multifunctional manner, as a mortgage, savings and current account ("checking" account in US terminology), as well as providing other lending facilities.

For example, the ceiling, or Facility, up to which an individual's debt may rise is determined based upon a property value. The total value of loans, debits and credits determine the actual level (balance) at which that individual sits in the account. The single integrated account thus represents all financial matters for the individual. Financial transactions such as car loans or a mortgage are treated simply as debits against the account with credits to the account treated similarly. Transactions can be carried out on an individual basis affecting the total balance of the account. There is an absolute constraint that the total debt at any time must not exceed the Facility. There is also a "target" curve for reducing the debt over time. This target curve corresponds to the typical debt curve of a repayment mortgage, the difference with the integrated account being that day-to-day debits, credits, savings and loan accounts are effectively temporary deviations from the target curve, rather than separate accounts.

In the example process structure shown a customer 50 can enter the system via log in module 55 to access a financial management system through the integrated account facility 60 (embodied in database 25 or host 30 in FIG. 1). The integrated account is linked to a separate banking account engine 65 which hosts the necessary computing and database resources for the operation of a bank account (within 30 in FIG. 1). The means used for accessing the system and the computing and database resources could be any of those channels discussed for FIG. 1 above. For example, a personal computer could be used to access remote computer resources 25 and 30 via the Internet. The means used for navigating the account may be suitably adapted internet browser software capable of communicating with the remote system.

The module 65 provides summary details of the banking account and further provides access to modules 70-95 which control or implement other banking account related services. These modules can be implemented in a desired fashion, centralised or distributed, in separate hardware or common hardware, as the skilled person will readily appreciate. The choice of any particular implementation forms no part of the present invention, and the following description, for convenience, does not distinguish between the hardware/software modules 70-95 etc and the services which they provide.

The customer can navigate to these services (that is, can interact with the relevant modules) in order to scrutinise account details and services. For example, at the top level of selection, the customer can navigate to the services providing details of account activity (transactions) (module 70), regular payments (75) and one off payments (80). Additionally the customer can print (85) account information, check for service related messages (90) and alter account settings (95).

The customer has some control over the presentation and control of account information via sub-modules under the top-level modules 70-95. Regarding navigation to view account activity, the customer may at 100 define filtered views of account information. For regular payments such as direct debits and standing orders or their equivalent, the customer may view their history (module 105), view details (110), amend details (115), or cancel the payments (120). Similarly, for irregular payments such as one-off bills the customer may cancel payments (125), view instructions (130), or create (135) and amend (140) payment details. The customer may also utilise the messaging service 90 to view messages and create new messages (145), reply to existing messages (150), view a history file (155) and other message details (160). Using the remote banking service the customer may alter settings on his account (95). These may include personal details (165) or customer preferences (170).

Figure 3:
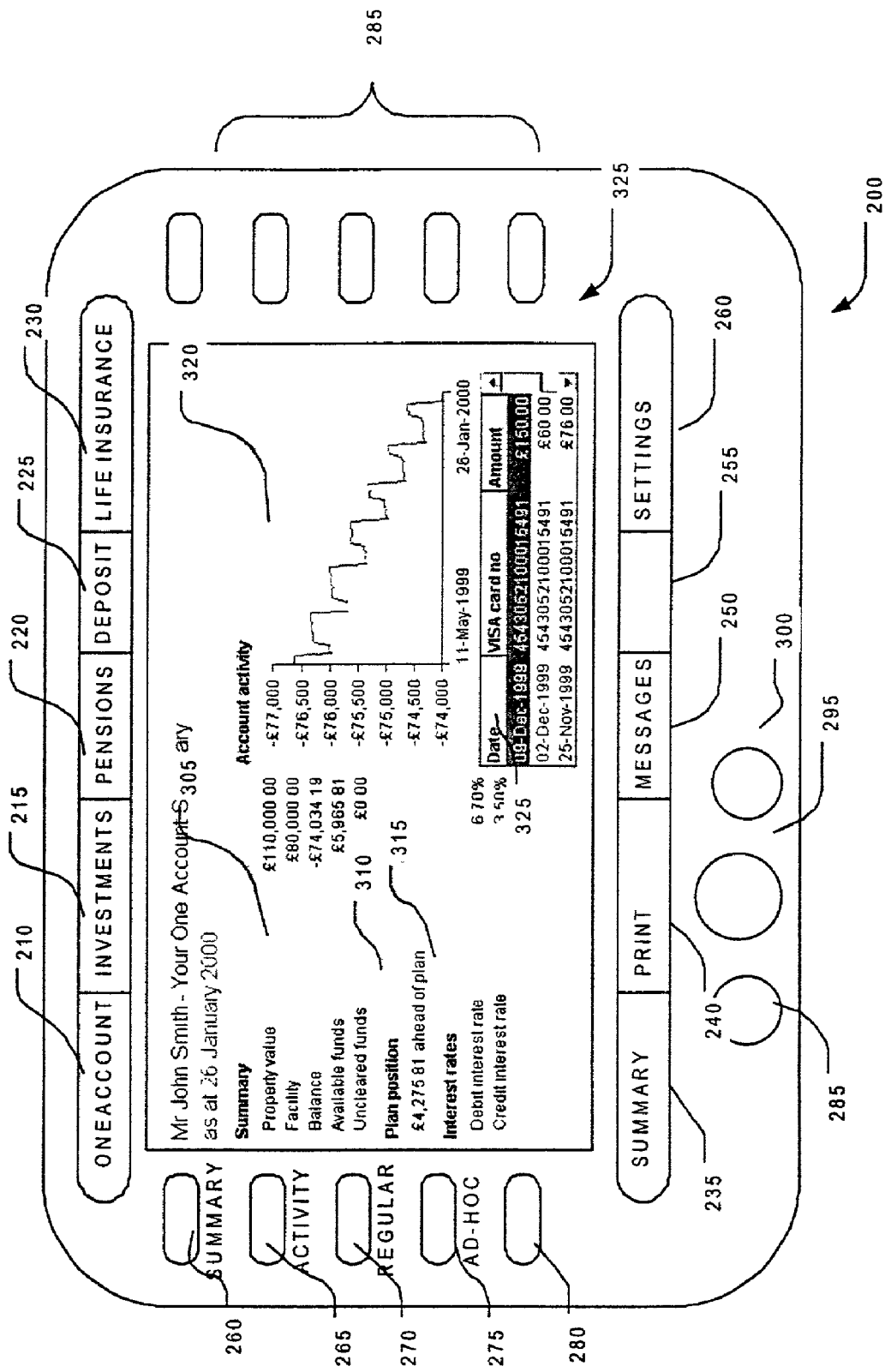
FIG. 3 shows an example interface screen for user interaction with a known financial management system.

FIG. 3 shows an example of a customer interface for use with the financial management system outlined above wherein the method of interrogating the account is via the internet. Shown is an screen display 200, organised into separate areas for the display of information relating to a financial product. The customer can view details relating to the different financial products provided by the system. In this example navigation buttons 210-230 are provided to navigate to screens dedicated to these products, activating these buttons directing the customer interface to display the appropriate information. Other buttons 235-260 are provided to enable other functional services. For each product there are further navigation buttons 260-280 which enable the customer to view different screens relating services for that product. Other buttons 285 may be provided to add functionality to navigation and use of the financial services available. For example, buttons may be provided to confirm 290, cancel 295, or query 300 an action.

In this example the One Account product button 210 has been activated so that the display screen shows information relating to the integrated banking account. The account summary button 260 has also been activated so that the display screen 200 shows sections representing a summary 305 of the account attributes, a statement of "plan position" 310 and current interest rates applicable 315. At this stage, module 60 is active (FIG. 2). Also shown is a graph 320 showing account activity and a summary of credit card transactions 325.

The features shown in FIG. 2 and in FIG. 3 as described so far represent the "real" banking account and the primary customer interface means, referred to in the introductory portion of this specification above.

Budget Planner—Overview

Figure 4:
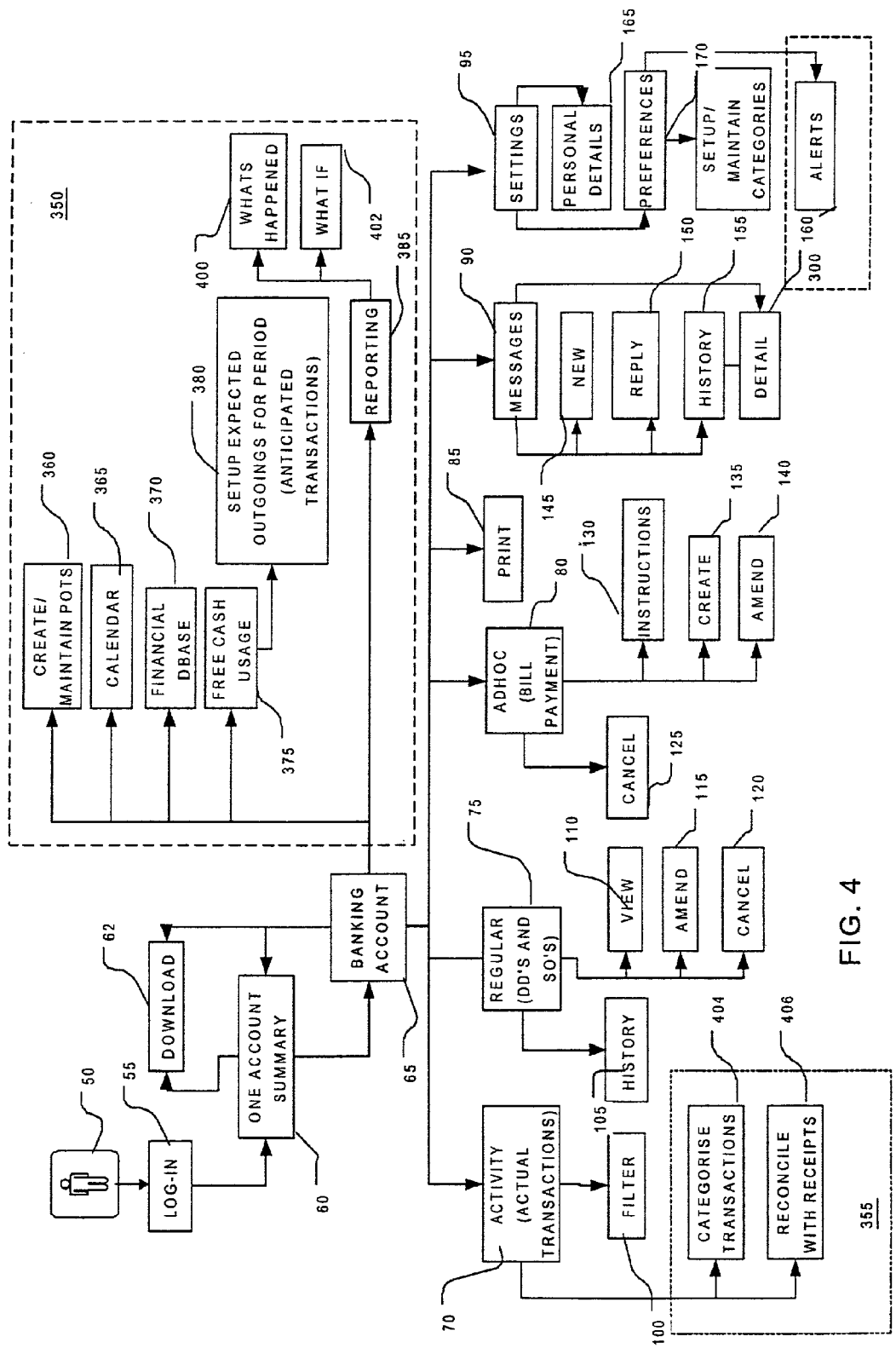
FIG. 4 illustrates the basic structure and navigation arrangement for an improved financial management system including a budget planner forming secondary customer interface means in accordance with an embodiment of the present invention.

FIG. 4 illustrates the structure and navigation arrangement for a financial management system providing an integrated account with the additional capability to create, manage and maintain virtual financial facilities.

Such a virtual financial management system, or "budget planner", forms a secondary customer interface means 350 and allows the customer to define various categories of transactions in for virtual accounts relating to different matters and produce reports on them. By using this service the customer is able to access an augmented integrated banking account service which has an number of improvements to that outlined in FIG. 2, while the single integrated account, with all the attendant benefits, operates beneath.

The financial management system providing the services indicated in FIG. 4 allows a customer to exercise a high degree of control over the manner in which financial matters are presented and categorised, allowing added functionality and features to the integrated banking account not previously present. As before, the customer 50 may log in (55) and access information and all the other features as described for FIG. 2. Within the secondary customer interface means 350 (the budget planner) module 360 gives the customer the ability to create and maintain "pots" or which are effectively "virtual" sub-accounts of the parent account, according to customer defined parameters. Also provided are a calendar function 365, financial database functionality 370 and a "free cash" usage function 375 which further has a budgeting function 380 by which the customer can allow for future anticipated transactions. Additionally the customer can create custom reports (385) on his account, detailing both past transactions (400), and future transactions. The customer can create and model different financial scenarios (402). The modelled results can be linked back to create targets in the budget planner by creating or amending pots (360), which will impact the free cash 375 to aid the customer manage their real account usage to try to follow the modelled scenarios.

To enable this added functionality the customer also has the ability to categorise transactions (module 404 within 355). In connection with this, the customer may also reconcile transactions with receipts (406).

By module 350 and 355, additional services may be provided to augment the simple single integrated account to make it more versatile, as will be described below in more detail. The customer can choose to categorise transactions and track them, assigning them to virtual sub-accounts of the parent account by creating pots. The additional functionality can be added in such a manner that the operation of the single integrated account and the benefits thereof are not disrupted. In the embodiment described above, the versatile integrated account provided by the improved financial management system is realised by employing an application on the server side of the banking account computing resources. This can gather the appropriate data from the banking account host computer and related databases with another application used to display the information in the appropriate format on the customer's screen.

In the embodiment discussed, the application is held entirely server side and implemented in the Java computing language with Java Server Pages (JSPs) used to display the required data on screen. Such server side based software can process the customer's commands, fetch and process the relevant data from the banking account host computer and display on the customer's remote access device, in this case an internet enabled personal computer.

One feature of the budget planner 350 is that it need not operate in real-time, or with the reliability and security of the real banking system. In other possible embodiments, other models for the customer data and single integrated account may be employed. For example, it is also possible for some or all of the applications providing the additional functionality to be located on client side of the operation. However, it is intended that the implementation will be platform independent and thus the amount of specific client-side functionality required will be limited.

Data Model and Virtual Sub-Account Structure

Figure 5:
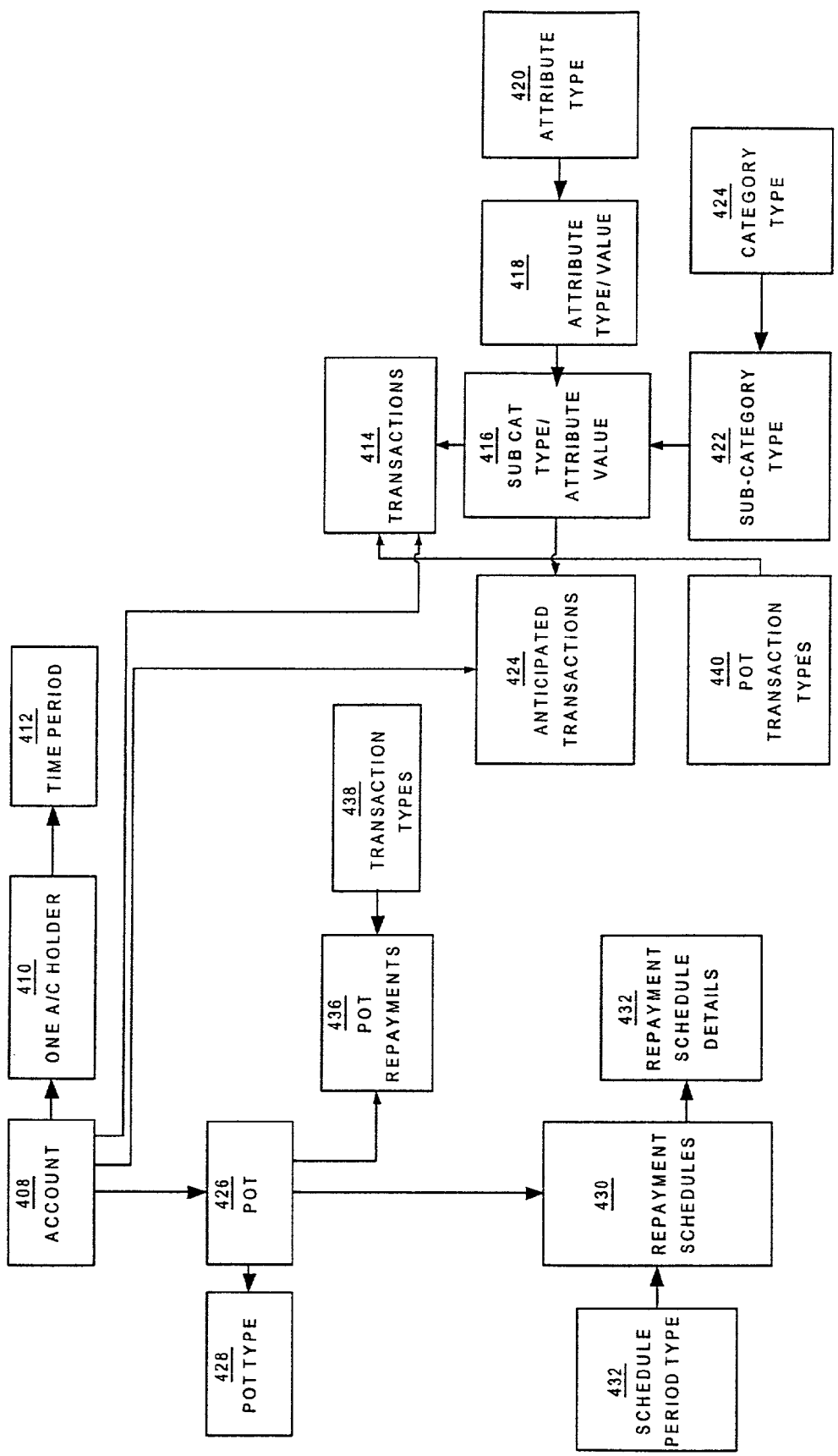
FIG. 5 shows a logical data structure for the improved financial management system according to an embodiment of the present invention.

FIG. 5 shows the logical data structure implemented within the budget planner 350, in conjunction with the "real" banking database. This has the capability to support creating, managing and maintaining virtual sub-accounts for the provision of additional financial facilities. This shows the inter-relationship of the different data types needed to be held in order for the system to create and maintain the additional functions and features described above.

At the head of the logical data model is the data 408 relating to the single integrated account itself. This data relates to the fundamental aspects of the account such as the account balance, facility and interest rate. Personal information 410 relating to the account holder is linked to this which is further linked to date-related data 412 such as period type and start and end dates over which other data for the account has been calculated. For the purposes of this example the account represented by account data 408 can be though of as a parent account from which the customer may define further virtual sub-accounts.

Linked to the basic account data 408 are data on account transactions 414. Basic details included here would include the type of transaction such as debit or credit to the account, the amount of the transaction and date carried out and to what client the transaction is related. The category or attributes of the transaction, and whether or not the transaction has been reconciled is stored in a related virtual transaction record (424).

From the basic transaction data 414 are linked more data fields giving greater detail on transactions. These include data structures 416 linking transactions to sub-category or attribute type with further sub-trees on each attribute 418, 420 and sub-category 422, 423 providing the list of possible categories/attributes. Categories such as "food", "drink", "car" etc. could be broken down to "car-fuel", "car-service" etc. or consolidated into "groceries" (combining "food" and "drink"). The operation of this will be described in more detail below with reference to FIG. 13.

There is also associated with the account data 408 a set of data describing anticipated transactions 424, linking to the sub-category and attribute data 416. This data relates to any transactions which are anticipated to happen in the future with the basic data structure of transactions 414 but with expected dates for which the transaction is expected, the actual date of the transaction and whether or not the transaction has actually taken place.

In addition to this data structure there is also a data structure relating to the "pot" data, that is, a data structure relating to the virtual sub-accounts which may be defined on top/into the existing account structure. Account data is stored at account level on a number of tables. The customer's virtual accounts are stored in separate tables that are linked to the real account data via a link table. This provides the link between the real account and a virtual bank account for each of the virtual sub-accounts for that account. Information such as the interest rate is extracted using the real account (data 408) and linked to the virtual account via the look up table.

The basic pot data 426 defines the central fields for the pots such as the pot type. For each pot there will also be fields for the pot balance, the related interest rate, and the planned balance for that pot. The pot data will also have a description of that pot, for example "Car loan".

Linked to the basic pot data structure are data on pot type 428 which classifies the type of sub-account for a pot. Typical examples of pot type would include saving and debt type sub-accounts. There are also fields relating to pot repayments (436) and transaction types (438). A pot transaction types data structure 440 is linked with the transaction logical data model 414. Pot repayments in this example are stored as virtual transactions.

This logical data model allows for the superposition of virtual sub-accounts on a single integrated account structure without interfering with the regular operation of such an account, as will be described in further detail below. This will enable customers to have (or at least view) their savings, loans and current account along the lines of a conventional bank whilst keeping all of benefits which the integrated account has to offer.

Budget Planner Core Processing

Figure 6A:
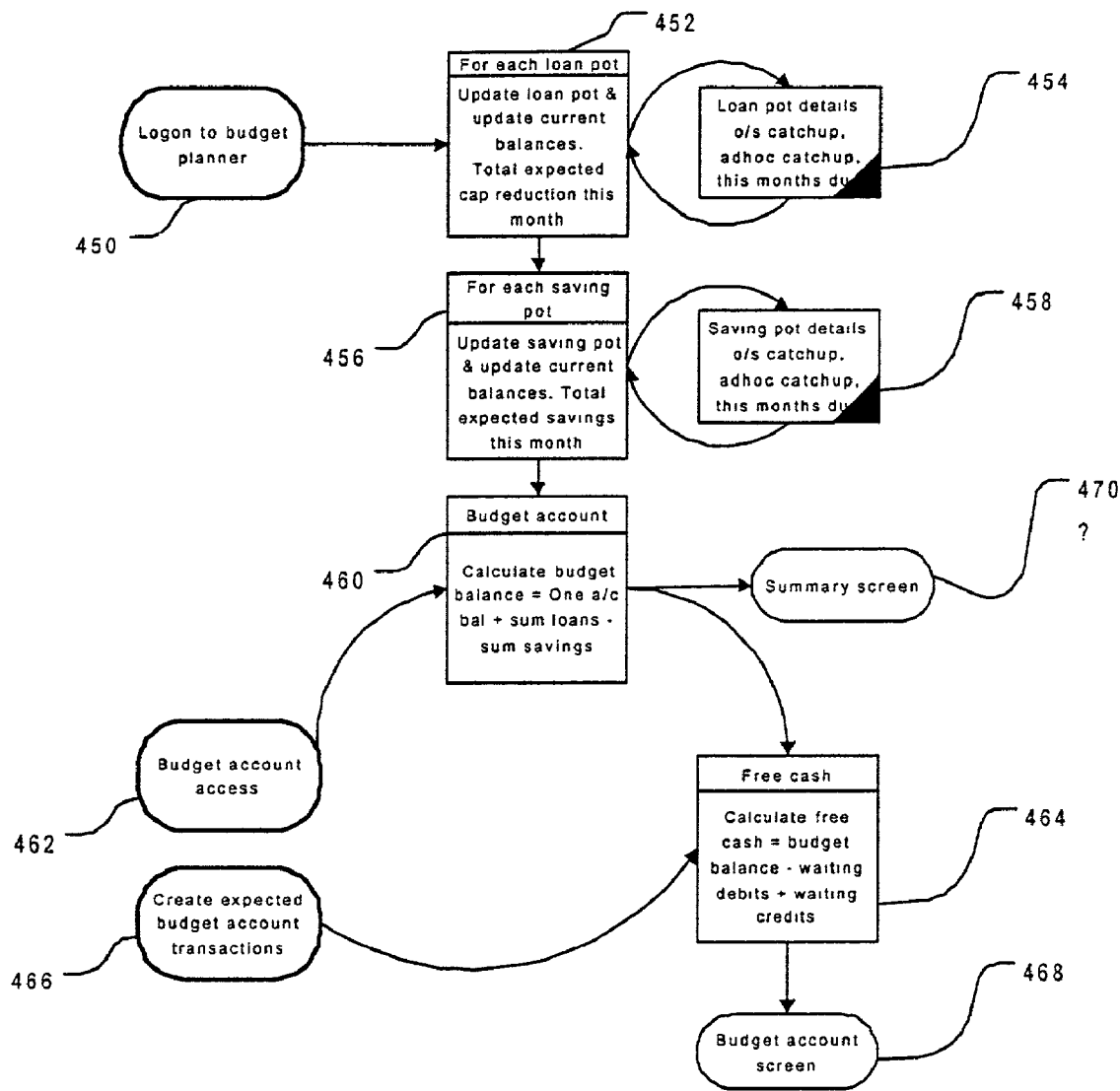
FIGS. 6A and 6B shows core processing steps of the budget planner implemented in the improved financial management system.
Figure 6B:
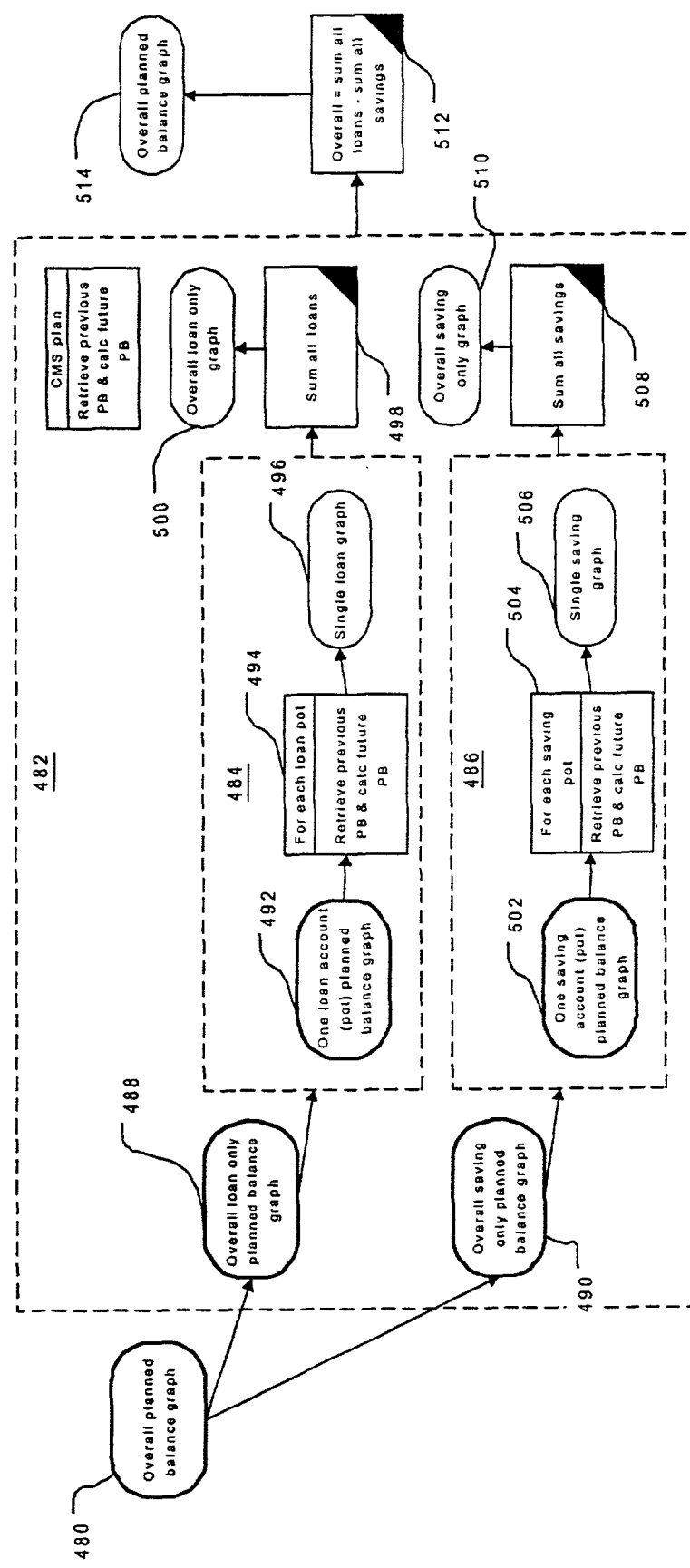

FIGS. 6A and 6B show processing steps implemented within the budget planner 350 FIG. 6A shows the basic steps carried out when determining the content and status of the virtual accounts and presenting the requisite information for the customer.

The customer logs on to the budget planner at step 450. The system retrieves the "real" account balance from the banking system, which corresponds to the spot ledger as at the end of the last business day. The system then sums all the loan pot balances (452, 454) and sums all the savings pot balances (456, 458). Using the resultant figures from these calculations the system then calculates the current account balance at 460 before allowing the customer access to the budget account at 462. This provides the functionality for the versatile integrated account and uses the formula:

$$\text{Balance} = \text{account balance} + \text{sum of all loan pot balances} - \text{sum of all savings pot balances}.$$

The system can on request estimate at 464 the amount of "free cash" available to the customer. The free cash balance is calculated using the formula:

$$\text{Free Cash Balance} = \text{Current account balance} - \text{sum of all waiting debits} + \text{sum of all waiting credits}$$

This "free cash" calculation therefore takes into account expected transactions created by the customer for the budget account in another process step 466.

The results of the calculations can then be displayed either as part of the summary screen (470) or as part of another separate screen dedicated to specific function, in this example a budget account screen (468) which displays information relating to the free cash the customer has available to spend.

The processing for displaying individual and overall planned balances is shown in FIG. 6B. The individual loan and savings pots have their own planned balances which can be displayed as graphs over time. The individual planned balances can be combined to create summary planned balance graphs for all loans and all savings respectively, and then overall planned balance data and graphs. From initiation of the process at 480, process 482 includes sub-processes handling loans pots (484) and savings pots (486). These sub-processes are initiated at 488 (loans) and 490 (savings), as shown.

Within 484 steps 492-496 calculate the overall loan-only planned balance (PB) graph by firstly calculating separate loan account PB graphs, representing single pots. For each loan pot the step 494 retrieves previous PB data and calculates future PB data to produce a single loan graph 496. A process step 498 can sum the separate loans to produce a new updated overall loan-only graph 500. Similarly the overall savings-only PB process 486 is implemented by calculating separate savings account PB graphs in steps 502-506. For each loan pot step 504 can retrieve previous PB data and calculate future PB data to produce a single savings graph 506. A step 508 can sum the separate savings to produce an overall savings-only graph 510.

From the output of process 482 the system can calculate the overall planned balance 512 to produce a revised overall planned balance graph 514. This includes the bank's standard repayment plan alongside the customer's own repayment plan which can be broken back down into its constituent parts. This process can be repeated as often as is necessary to keep the account information and display up to date.

Loan Pot Processing

FIGS. 7A to 7D show in detail the steps implemented in the budget planner for loan pot related processes, for example those associated with the creation and management of loan pots. Details of some of the algorithms for each of the processing stages discussed for this flow chart are given in the Appendix.

Initially, at 520 a customer logs on to the "Budget Account" area (350) of the banking account customer interface, here modelled as an addition to the known Virgin One® account. The system begins by performing step 522 which obtains information relating to the customer's actual account. For example, this stage retrieves the interest rate and initialises variables such as setting the coming month's expected total capital reduction to zero. The system then proceeds to carry out a number of housekeeping tasks needed for the maintenance of the pots before showing any details which result from the balances of the pots. These include checks to see if any loan pots have a (virtual) regular payment that has been missed because the customer has not logged on for over a month (or whatever the period has been set to).

Each loan pot is checked 524 to determine if the loan pot has any remaining capital to pay off (interest only loans will not have any capital to pay off). If there is still capital owing on the loan pot a further check is performed (526) to test if there is any capital reduction overdue (because the customer has not logged on for over a month). This is performed for every loan pot where the stored capital PB is greater than zero and if a regular payment has been missed because the customer has not logged on for over a month missing the last regular pot payment, the outstanding capital reduction due is then calculated 528.

There is an option to allow for the automatic management of pots without the need for manual intervention by the customer. If there is an outstanding amount due, the system checks at 530 whether the pot is manually maintained the recommended payment for the loan pot is stored thus indicating that the pot still has an outstanding manual payment due. The system then proceeds back to step 524 for the next loan pot. If the auto-look-after function has been set (i.e. automatically maintain the pot PB) then the system proceeds to create a transaction 534 for the loan pot. This is the process called for every pot where a payment is overdue from the previous month or earlier, creating the necessary transaction and storing 536 the relevant changes for that pot. The system then proceeds back to step 524 for the next loan pot.

After processing the outstanding capital reduction through steps 524-536 the system checks 538 if any of the loan pots still have any capital reduction outstanding. This is called once per logon after the automatic catch up payments have been made. For each pot that has a manual catch up payment due the payment is displayed 540 and can be checked and changed before being confirmed. After checking 542 that the amount due is not zero a suitable transaction is created 544 and details stored that the pot is correct as at the end of the previous month (or time period). This allows the customer to be asked once for all overdue manual loan payments.

After capital reduction has been dealt with the system then proceeds to check 548 if there are any unpaid ad hoc transactions outstanding. If so, then the system performs a sub-process 552 for each ad hoc transaction, for each pot. The system checks that the transaction amount is less than or equal to the last planned balance and if it is not then adjusts the transaction amount to be the stored last planned balance (to stop the loan pot going into credit). The system then applies either the original or modified transaction and changes the current balance. The stored last capital planned balance is then updated. The system then returns to step 548. Checking and processing is carried out for each pot. After all the pots' ad hoc payments have been checked the ad hoc payment date is updated at 550.

Figure 7A:
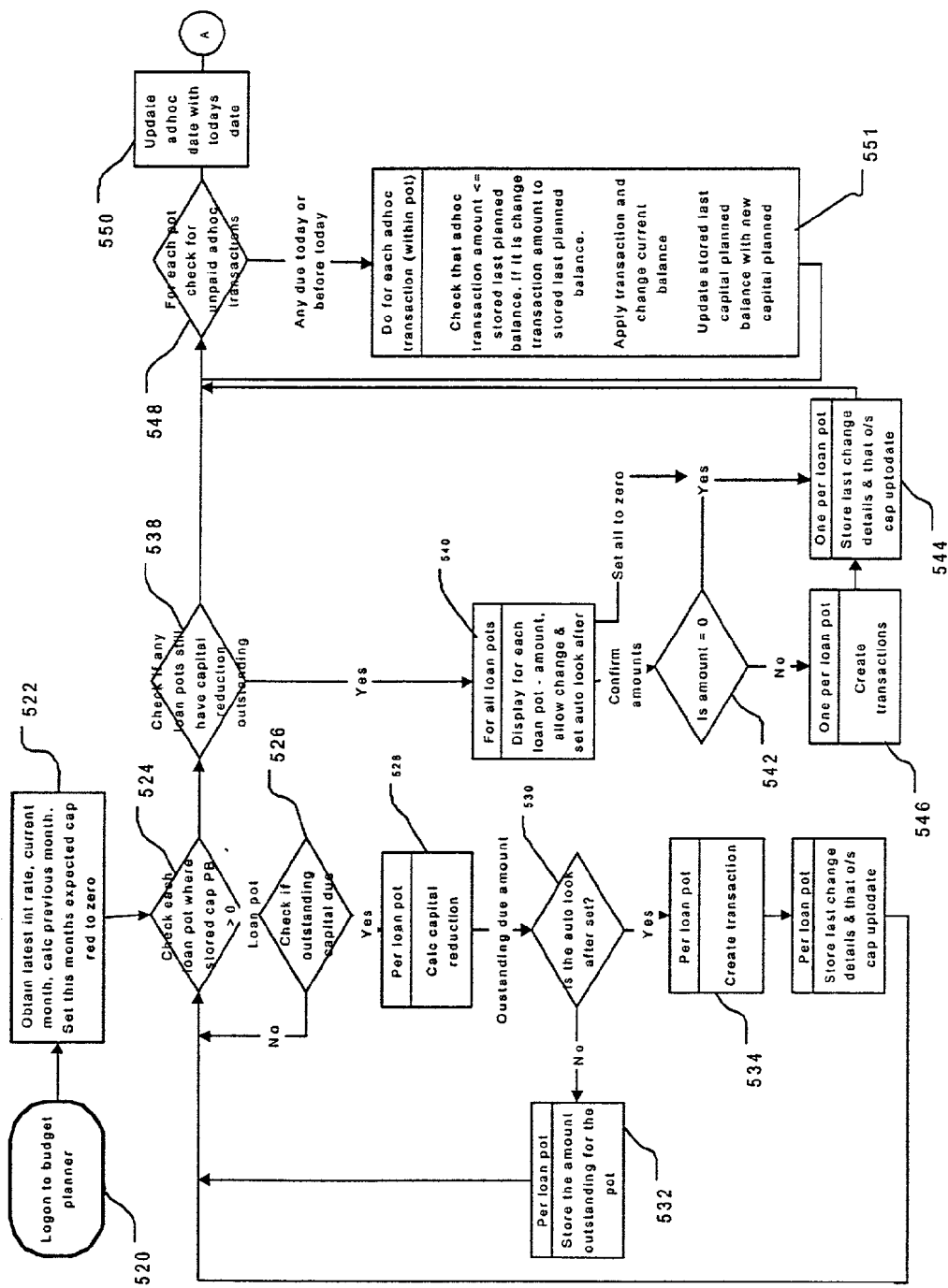
FIGS. 7A to 7D show an operational flowchart for implementing customer instructions for loan pot related events in the budget planner.
Figure 7B:
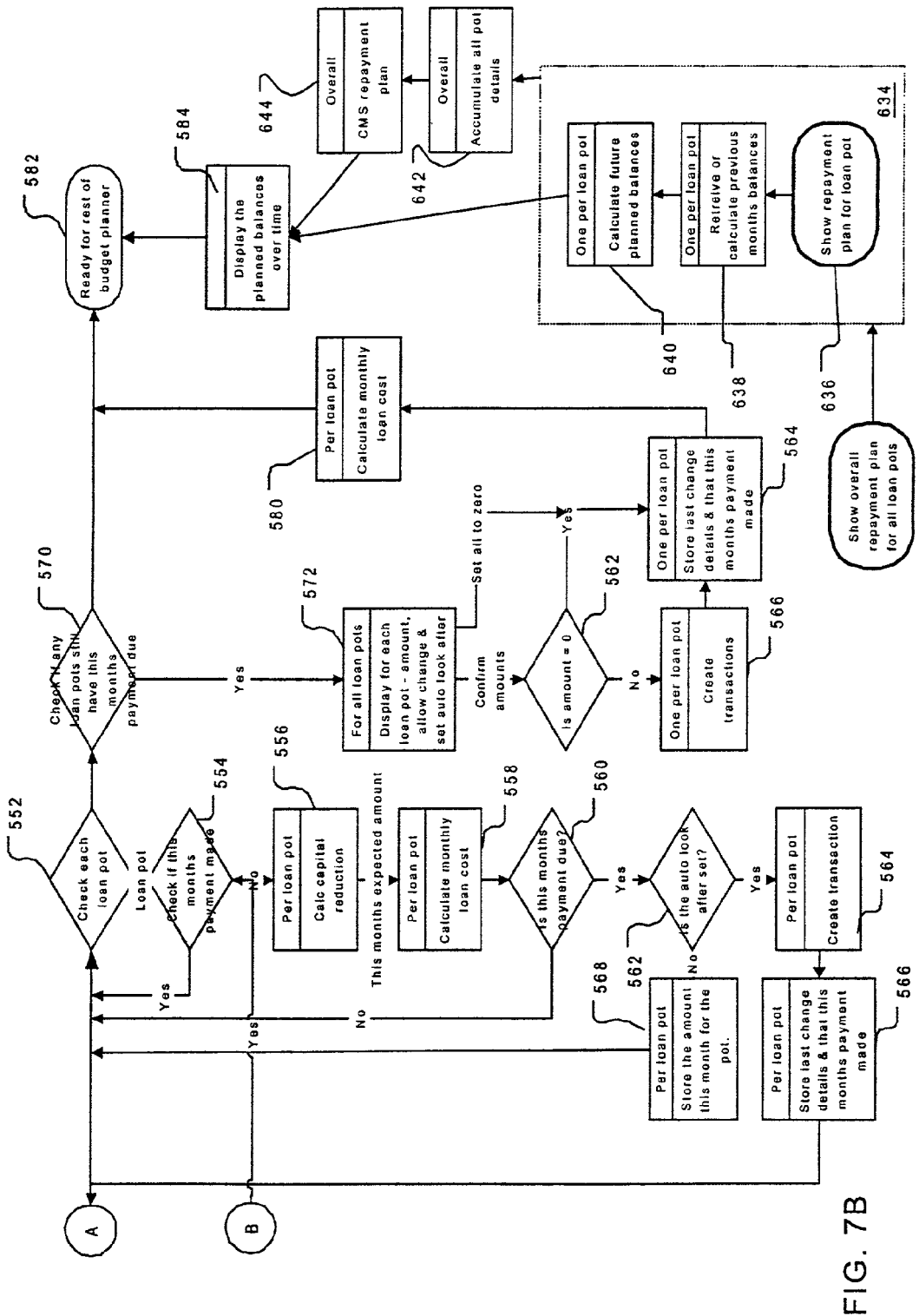

Referring now to FIG. 7B as a continuation of the flowchart of FIG. 7A, the system then proceeds to process each loan pot to check and calculate this month's capital payments.

First, each loan pot is checked 552, 554 and if the payment for that month has not been made yet then the capital reduction per loan pot is calculated 556 and monthly loan cost per loan pot calculated 558. If the system determines that this month's payment is due 560 and that the auto-look-after function has been set 562 then the transaction is created 564 and the change details stored 566. If the auto-look-after has not been set then the system stores the relevant amount for the pot 568.

After processing each pot in this fashion the system then proceeds to check 570 if any loan pots still have this month's payment due. This is called once per logon after the automatic catch up payments have been made. For each pot that has a manual catch-up payment due, the payment is displayed 572 and can be checked and changed before being confirmed. After a check has been made to determine if the amount is zero 574 the transaction is made 576 and the pot updated 578 so as to be correct as at the end of the current month. The monthly loan cost for each loan pot is recalculated 580 in case the recommended payment in 572 has been changed.

Once the system has performed these "housekeeping" functions it is ready 582 to proceed with dealing with the regular functions of the budget planner such as the budget account view.

Also shown in FIGS. 7A-7D are the steps the system performs for other events. These can be triggered as activating buttons on a user interface, for example of the general type depicted previously in FIG. 3. The actual manner in which a customer accesses the services and triggers events could be through any number of channels used to access the account features.

Creating/Maintaining Virtual Sub-Accounts

Figure 7C:
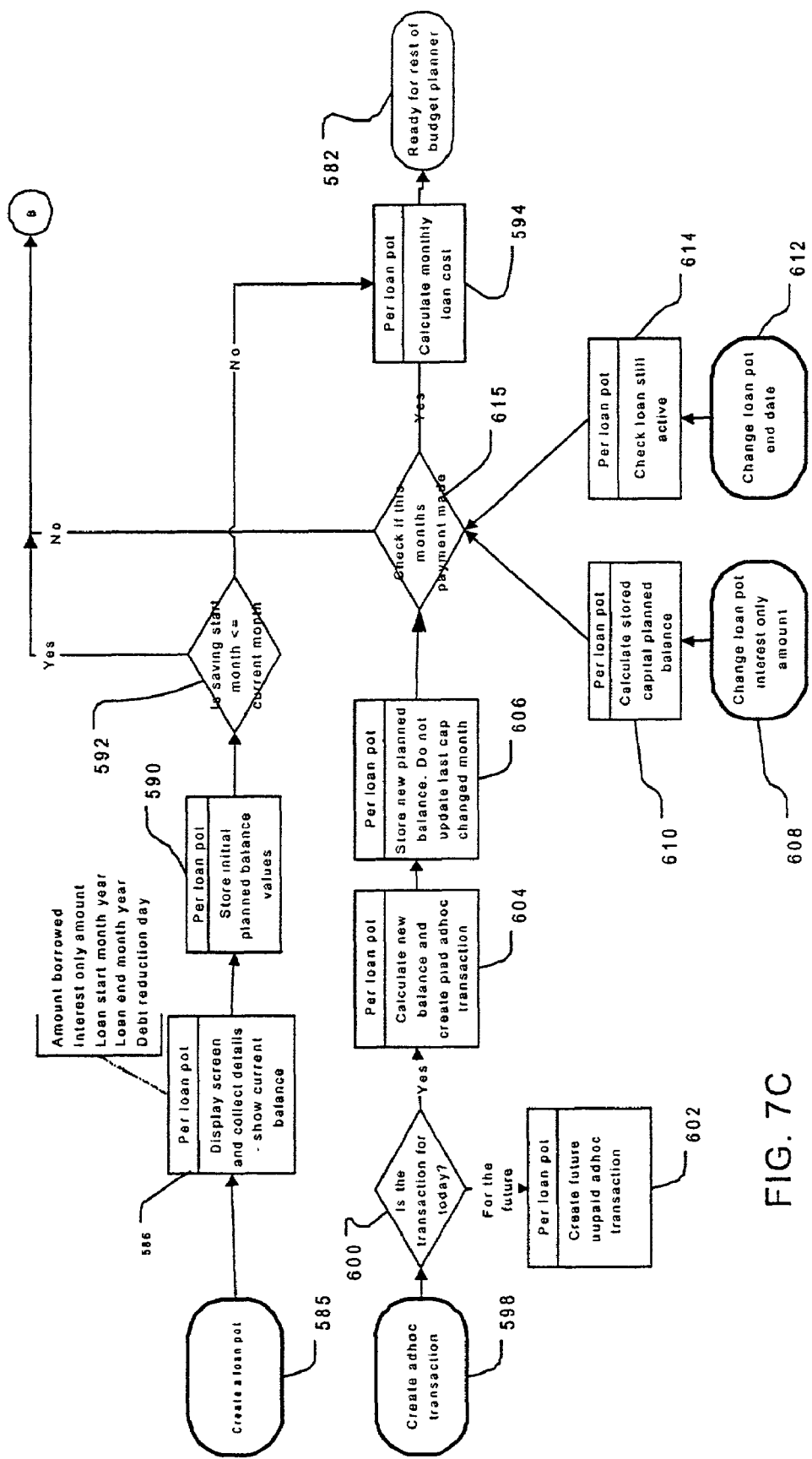

Moving now to FIG. 7C, the system can create a loan pot by a procedure starting at 585. For each loan pot the system collects and displays the relevant details at 586 and stores the initial planned balance values at 590. The monthly loan cost per loan pot is calculated and a check 592 carried out to determine if the saving start month is on or before the current month. If the saving start month is not on or before the current month then the system proceeds to calculate the monthly loan cost 594 an assumes ready state 582 as before. If the saving start month is on or before the current month then the system proceeds to the housekeeping functions at 556.

The creation of new pots may be implemented in a number of ways, in terms of customer interaction. For example, by activating this function the customer can be presented by a data capture screen allowing the customer to record the relevant details for that new pot. Selecting the type of pot will dictate which fields the customer will be presented with and which need to be completed. The customer specifies the reason for the pot (category and sub-category) which can be user-defined or according to a pre-defined reason provided by the system (for example "car", "holiday", "home improvement").

A pop-up box control on the user interface showing a tree directory of categories offers controls to add, amend or cancel categories and sub-categories. It is also possible to split and re-categorise existing categories.

The system can also create new ad hoc (irregular) payments in relation to a loan pot, starting at 598. The system first checks 600 if the transaction is for that day, and if not then creates 602 a "future" unpaid ad hoc transaction. If the transaction is scheduled for that day then the system calculates 604 the new balance and creates a "paid" ad hoc transaction and stores 606 the new planned balance. The last capital changed month is not updated so that the payment of ad hoc amounts does not interfere with the regular payment schedule. The system then proceeds to check 615 if the payment for this month payment has been made. If the payment has been made it proceeds to calculate 594 the monthly loan cost as before, then assuming ready state 582. If the payment has not been made then the system proceeds to the housekeeping functions at 556 (FIG. 7B).

Starting at 608, if the customer wishes to change the loan pot interest-only amount then the system calculates the stored capital planned balance 610 and proceeds to steps 615 and 594 to calculate the monthly loan cost, then proceeds from there as before.

Similarly, starting at 612, if the customer wishes to change a loan pot end date the system collects the relevant details and checks at 614 if the loan is still active before calculating the monthly loan cost at 615 and 594 and proceeding as before.

Figure 7D:
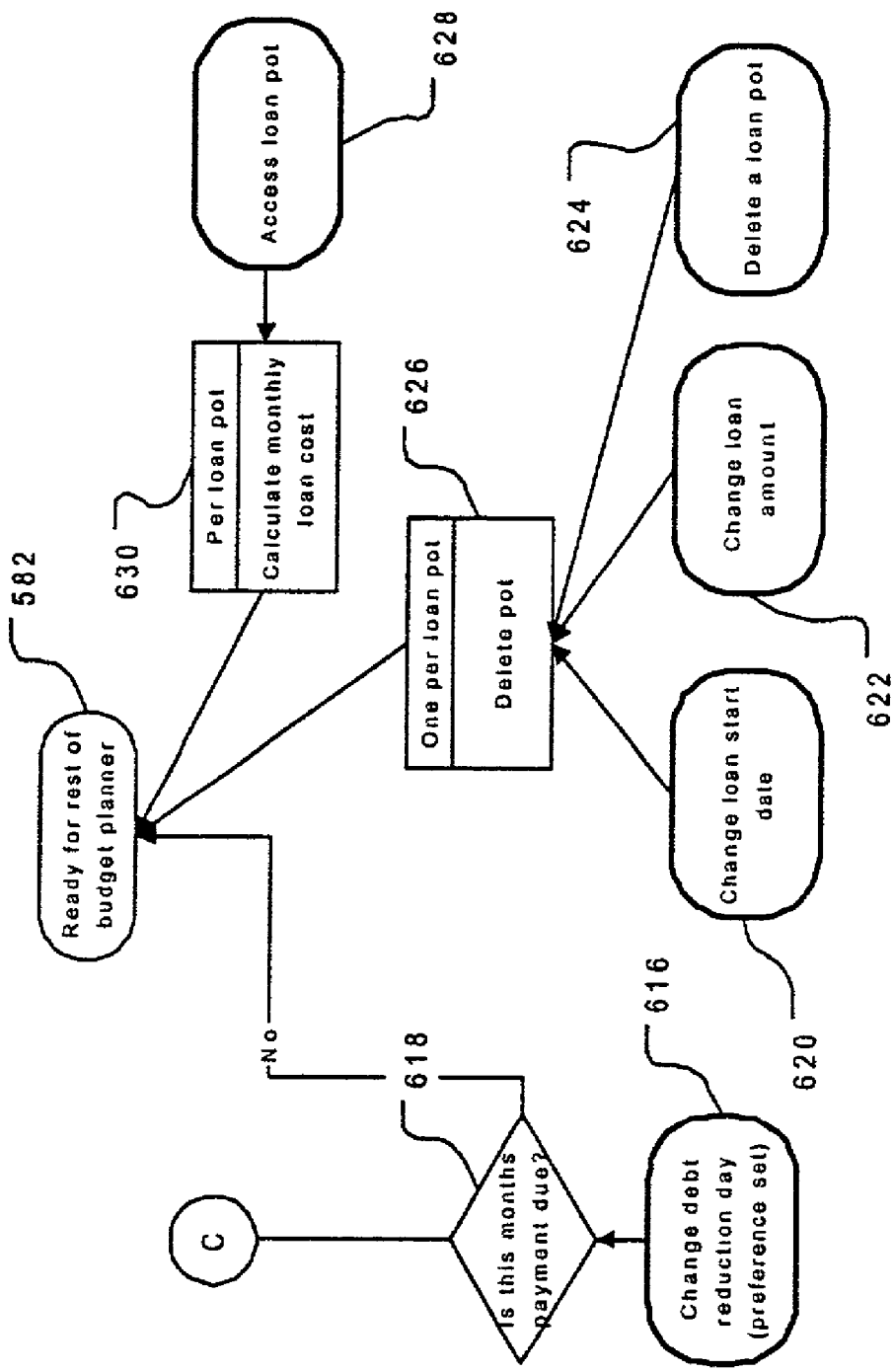

Moving to FIG. 7D, and starting at 616, if the customer wishes to change the debt reduction day then the system will first check at 618 if that month's payment is due. If not, the system will proceed to the ready state 582, but if so then the system will enter the housekeeping check stage 552 (FIG. 7B) as shown.

The customer can also initiate procedures to change other details of the loan pots such as the loan start date (620) or loan amount (622) and can further delete a loan pot (624). For each of these functions the system deletes the loan pot 626 before proceeding to the ready state 582 as before. That is to say, rather than changing these parameters of an existing loan pot, internally at least, the system prompts the customer to delete the loan pot and start again. Starting at 628, the customer can also access the details of each individual loan pot, where the system calculates the monthly loan cost for that loan pot at 630 and returns to ready state 582.

Referring back now to FIG. 7B, and starting at 632, the customer can ask the system to display the repayment plan for a single loan pot or all loan pots. The system first displays the repayment plan for a single loan pot 636 and then retrieves or calculates the previous month's balance per loan pot before calculating the future planned balance per loan pot. The system can then either display for a single loan pot (584) or accumulate details for all pots (642) and compare this with standard repayment plan plan before the displaying the results 584.

Similar functionality for similar events is provided for savings pots, the system allowing the customer to create and maintain savings pots in much the same way as for the loan pots described above. Detailed flowcharts for these are not provided, although the key procedures for both loan pots and savings pots are defined in the Appendix.

Customer Benefits

The internal structure and workings of the system having just been described, an overview of the benefits of the system just described will now be provided, from the point of view of the customer. Then a number of examples will be presented to demonstrate the different functions of the novel financial management system implementing the versatile integrated account, again from the point of view of the customer.

As explained elsewhere the customer has the ability to be able to divide up their account into one or more 'virtual' accounts represented by the "pots" maintained within the system, as described above. The pots can have specific purposes or types e.g. loan, saving, budget etc. Along with the ability to set-up these pots, the customer is also able to 'virtually' move money between them. There are at no time any real transactions affecting the parent account balance. All transactions between the pots are virtual, manipulating the raw integrated account information according to the specifications of the customer. Pots can be created and amended as wished, with the ability to create and amend virtual transactions for the pots. The customer can create views of summaries of each pot or balances across pots allowing the customer to track financial matters in detail. The customer has the ability to track pots, for example if they are saving for a specific amount by a specific time. To this end, each pot also has its own plan, allowing for the budgeting of future events and the like.

The ability to create 'virtual' loans and savings pots to represent the funds within the real account will provide the customer a more understandable view of their finances and enable them to plan far more easily. As the accounts are 'virtual', they can be created, amended and deleted at any point in time without fear of affecting the actual balance of the account, of running up real bank charges, or of making any irreversible financial decision.

When setting up the pots the customer is able to define specific parameters to order to help them track their progress, for example they wish to have a specific amount saved by a specific date or a loan repaid within a specific time-scale, without negotiation or restriction by the service provider. The necessary (virtual) repayment/savings plans are then created around these criteria As well as the regular payments as prescribed by the plans the customer will also be able to make ad hoc payments where it is identified that they have spare cash to do so. It is also flexible enough for the customer to withdraw payments from the account when extra money is required in a period.

Example Screens

Figure 8:
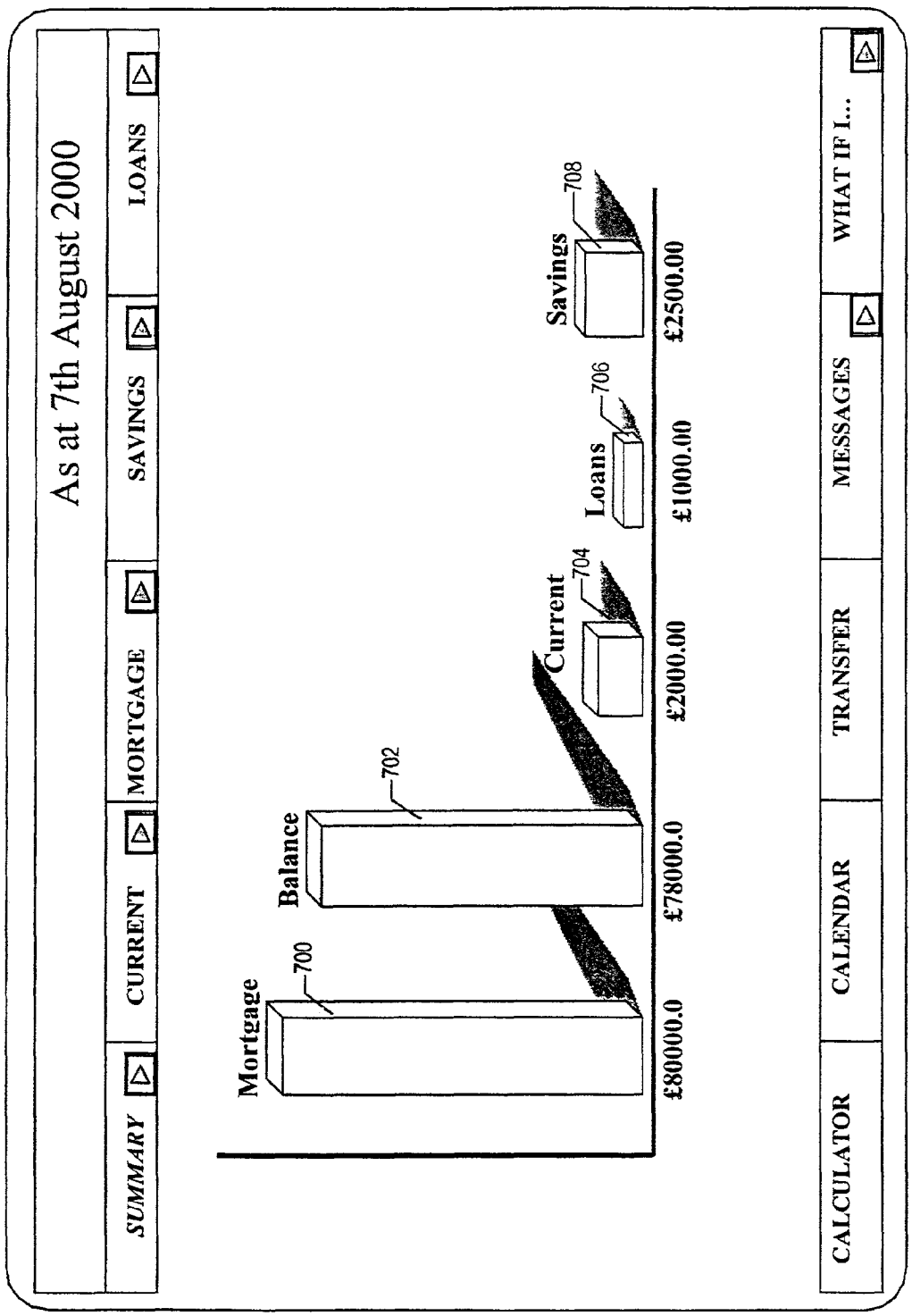
Figure 9:
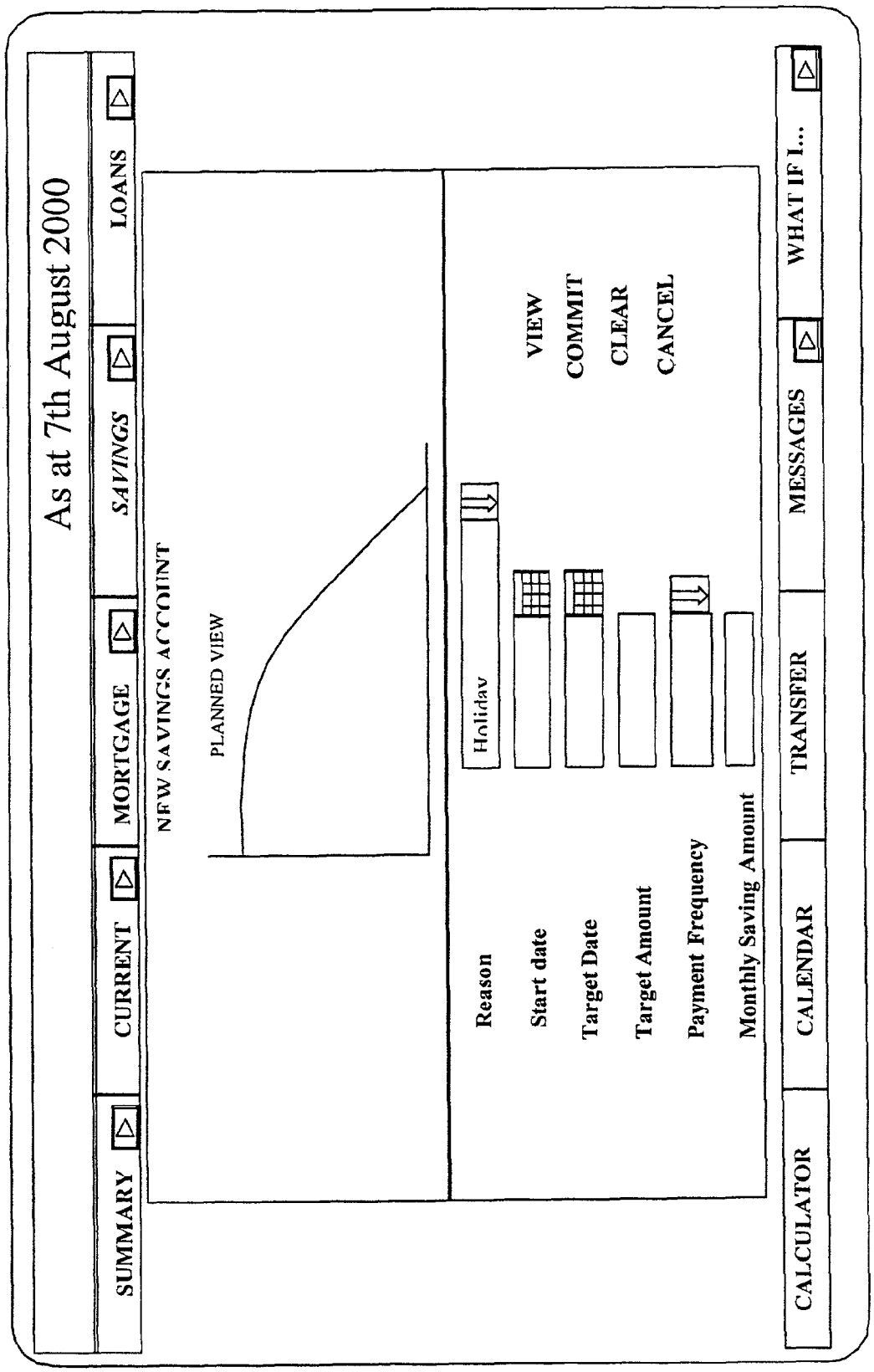

FIGS. 8 and 9 show example screens of the system as viewable by a customer. FIG. 8 shows a summary screen of such a versatile integrated account. This indicates how a single integrated account as represented in the example screen of FIG. 3 can be presented showing a breakdown of how the money in the account is allocated between virtual sub-accounts defined by the customer. In this example, pots representing a mortgage 700, the account balance 702, a pot equivalent to a current account 704, and pots representing loans 706 and savings 708 have been created.

FIG. 9 is a summary screen showing the pot details for a savings pot with a "tag" showing that money in this pot has been earmarked for a holiday. A graph 712 showing planned progress for this pot this pot is also shown. The hub for all savings/loan pots activity are the relevant summary screens. These screens will hold details of all savings/loans that the customer creates. A summary of each pot is created on the relevant summary screen and provides the customer with the key details of the pot, for example amount of saving to date, time to target.

The purpose of the summary screen is to provide the customer with a high level view of all of their 'accounts'. This screen will be the point of entry to the budget/financial planning system, initiating the various procedures described above with reference to FIGS. 7A-7D. This screen provides a graphical as well as numerical view of all pots in existence as well as the overall parent account balance. It basically interrogates all existing pot balances and displays them together to provide an overall view. Where multiple types of accounts exist the summary screen will only show the overall total e.g. if multiple savings pots exist the summary screen will show the overall saving, if multiple loans it will show the overall debt.

If the customer does require more information at this stage it could also be possible for them to 'double click' on a graphic which will then display the detail, e.g. savings graphic will display an overview of all current savings pots currently in existence. Balances displayed are correct as at the point in time that the budget tool was accessed/updated.

The customer can define the parameters for each individual pot that they create. When a pot is created a schedule of payment triggers will be set-up behind the scenes. As the pots are 'virtual' there are no real transactions that will occur to cause them to accumulate funds. The schedule therefore provides the mechanism that gives the impression that money is physically moving.

The customer also has the ability to view a detailed account of all payments that have been received into/have left the pot.

When a date on the schedule of payments is reached a number of actions will be triggered. The budget summary screen will be updated to show that the payment has been made. The detailed record of payments will be updated to show that a payment has been received. This in turn will update the total saving to date field on the pot summary.

The customer may decide that they wish to withdraw payments from their savings accounts in order to have a larger amount of free cash. In this situation the new monthly saving amount, target amount or end date will be calculated based on the user defined details. Interest is taken into account for loan pots to calculate the repayment plan and could be optional for savings pots.

The target date for any account cannot be greater than the agreed term of the parent account. Warnings can be given when the monthly virtual transaction amount into a pot is greater than the defined budget available for the period.

Available Cash Display

Figure 10:
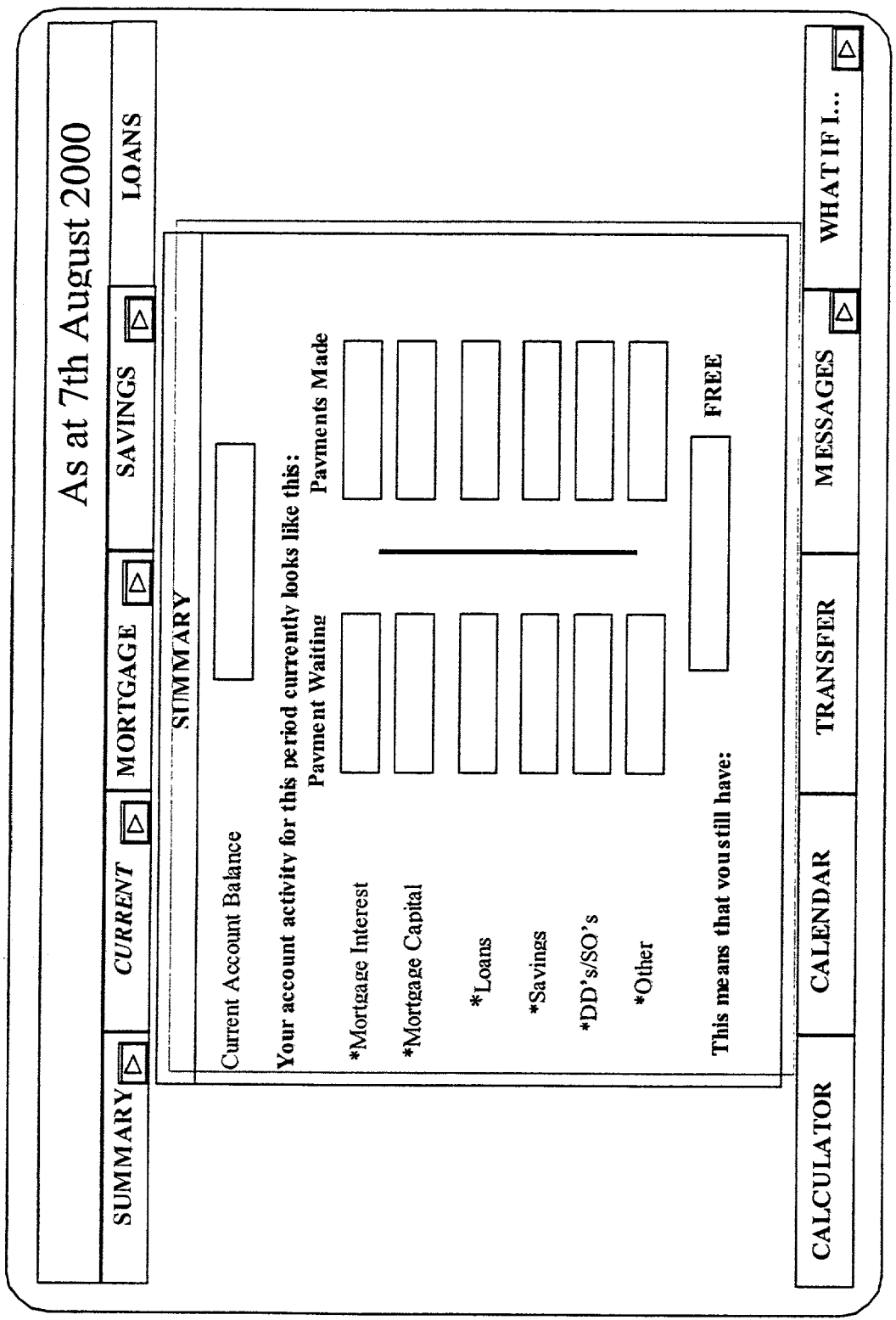

FIG. 10 shows an example of a screen for the "free cash" function. The customer can set up the improved account to enable a summary of how much "free" or available cash will be available to spend for a particular period, without deviating from his/her longer term plan. A period can be defined by the customer and credits and debit transactions entered for that month. These are transactions which have not already happened but are expected in this period and which the customer wishes to allow for. For example the customer knows that within the period planned they will be spending a set amount on a one off payment, for example, car repairs, and wishes to allow for this when determining their free cash. The customer can then set up expected outgoing for the period specified, specifying and viewing transactions and producing a summary of "free" cash available for spending. The customer can enter a specific budget within the current account that the free cash can be calculated from, in addition to the anticipated current account balance at the end of the period being looked at. The customer may further categorise and reconcile transactions with receipts and view summaries of free cash usage.

Free cash usage is essentially a view of the customers' budget account pot. The purpose of this pot is to enable the customer to see exactly how much cash is left to spend once all other outgoings for the period have been taken into consideration. This will therefore give an accurate daily view of their account for expense purposes.

Account Balance Display

Figure 11:
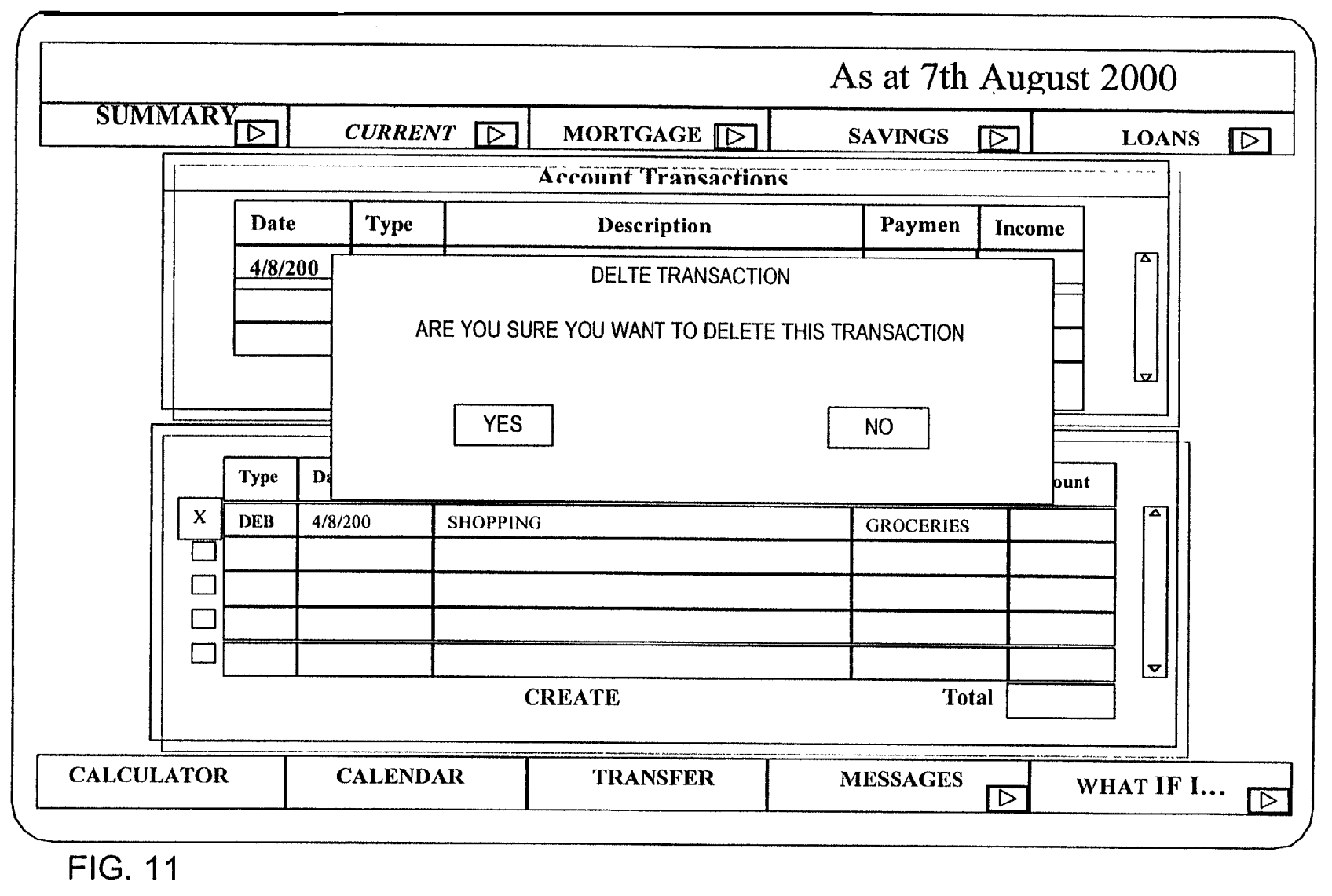

FIGS. 11 and 12 give example screens as implemented by this function, specifically to display current account balance and reconcile anticipated and actual transactions. These screens essentially provide the more conventional "bank statement" view of what is going on, what has happened and what the customer believes is going to happen, but incorporating both real and virtual transactions. The budget account balance is the consequence of setting up other pots such as the mortgage, loan savings and the like. For example if none of these pots are in existence the balance will simply be the current "real" account balance.

Once the budget balance is established the screen then shows all payments, both actual and virtual which will be made from the budget account. Actual transactions are defined as physical amounts which will leave the clients parent account, for example Direct Debits and standing orders, interest payments and anticipated transactions which the customer wishes to allow for. Virtual transactions include payments to loan (including pots marked as mortgages) and savings accounts.

In order to track their budget account and their free cash a customer must define the period over which the account will be tracked. There is a default or prompt to help the customer set up the period. Expected outgoings are the key elements that will be taken into consideration as part of the budget free cash calculation.

At the start of the defined period all of these payments will be awaiting. As and when payments are made this is illustrated by the payment amount showing as paid. For loans and savings the amount shown is the total of all loans and savings in existence. As they may have different payment dates the summary should reflect the correct proportion of the total as paid.

As already discussed there are no physical transactions which will trigger payments to be made to virtual accounts. The movement for these transactions on the budget account is therefore triggered by the payment schedule that is created when the pot is set up. There is however a mechanism which recognises when real payments such as Direct debits, standing orders and mortgage interest payments leave the account.

Definitions for expected outgoings are as follows:

Expected interest due—this will be the interest figure, either a pre-notified amount or an estimate for the period. Where it is an estimate there is an option on how to estimate the interest or to manually enter an amount in.

Expected Direct debits and standing orders—details of both Direct debits and standing orders are held on the current online service (module 75 in FIG. 4). As far as the budget account view is concerned, the figure will be the total of all Direct debits and standing orders which have been set-up or an average of previous Direct debits and standing orders. There will be an ability to override the direct debit amount.

Expected non-monitored/anticipated transactions—these are transactions which have yet to occur but which the customer wishes to allow for as part of their free cash (for example the customer will have to buy some new tyres for their car during that period). These can be credits as well as debits. These will need to be matched before they are removed as anticipated transactions.

It is possible to change or delete these transactions at any time. As previously discussed virtual transactions will be triggered by the payment schedule in place for the pot concerned which in turn will be put in place by the repayment plan for the pot.

Whilst the customer will be able to see at an overall level from the budget summary screen what their position is, they may also wish to know the detail which lies behind. This detail looks at the transactions that make up the balances and also allows the customer to create their anticipated transactions.

'Daily' Transactions

For transactions such as ATM, switch, cheque etc, the customer will see an up to date view of all transactions which have taken place. This functionality already exists within present online services. As an addition to this existing functionality there will also be a very simple mechanism for allowing the customer to manually reconcile their paper receipts against actual transactions. This is simply a form of tick box facility against each transaction which the customer can click when the transaction is matched up, as provided by existing manual-entry financial management products such as Quicken (® Intuit), without the need for downloading transaction detail.

Anticipated Transactions

Anticipated transactions allow the customer to key details of any payments that they know are going to take place during the period. These transactions can then be summarised within the budget account and taken into consideration when calculating the remaining free cash element. The customer can create any number of anticipated transactions for the future or in the past.

There is reconciliation mechanism which allows the customer to match anticipated transactions against their actual counterparts once they occur. Comparing FIGS. 11 and 12, a single transaction with payee "SUPERSTORE" is shown for simplicity. FIG. 11 shows the actual transaction dated 4 Aug. 2000 in the upper half of the display, which information is derived automatically from the real bank account. FIG. 12 shows the situation where the user has anticipated this transaction, and it appears as an anticipated transaction for 1 Aug. 2000 in the lower half of the display. The user has already assigned a category "GROCERIES" to this transaction. In this situation, once the matching real transaction has been effected (in fact on 4 Aug. 2000), the customer activates the check box beside that transaction to reconcile (match) it with the real transaction. The system then prompts the user to confirm deletion of the anticipated transaction, as shown in FIG. 12. At the same time, the system automatically transfers the category "GROCERIES" from the anticipated transaction to the real one.

Figure 13:
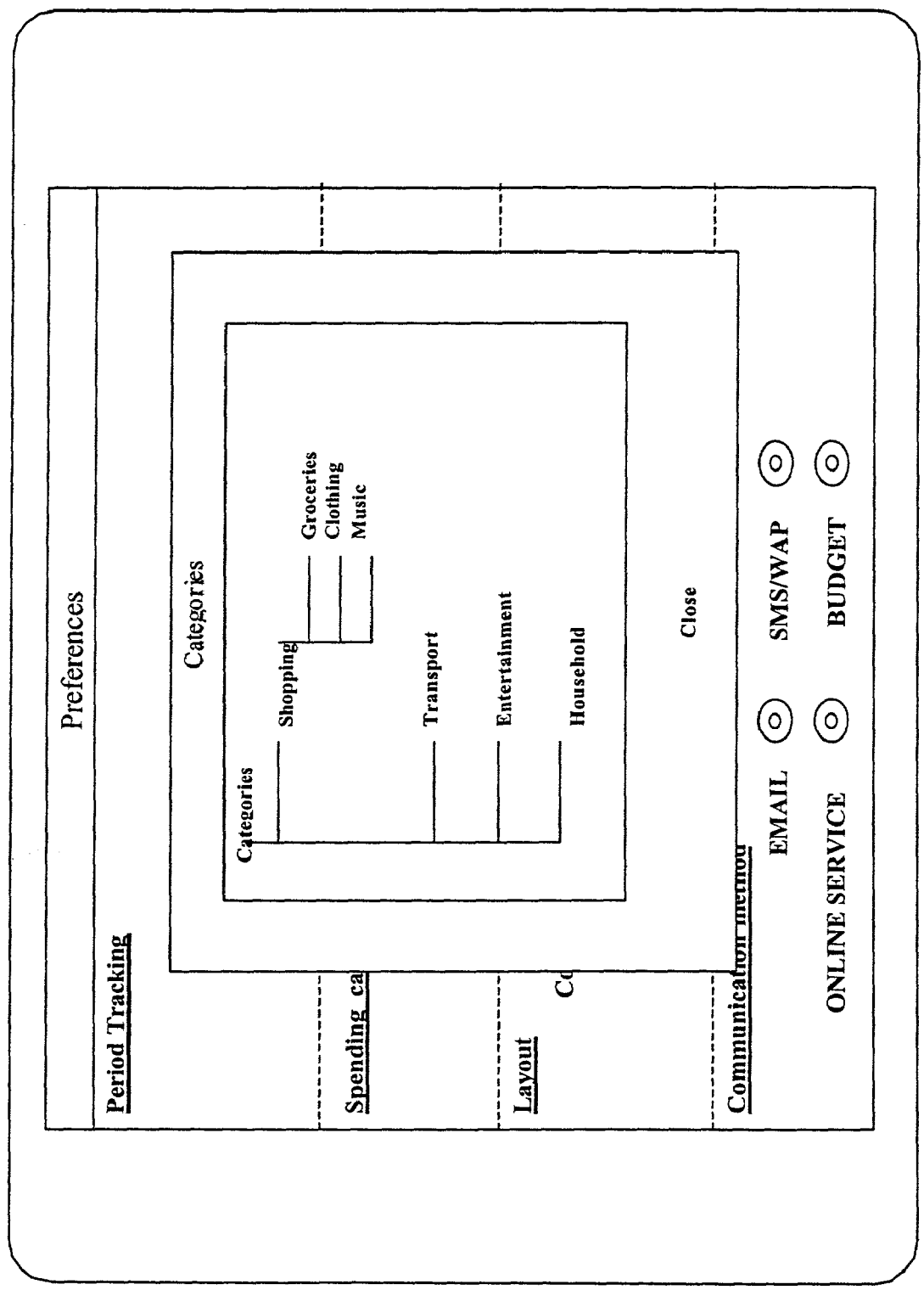

The customer is also allowed to delete anticipated transactions at any time, the system updating the free cash balance accordingly. It is also possible to split anticipated transactions to match actual, for example when a total anticipated shopping bill of £200 is actually made up of four separate shopping trips and should be matched accordingly Categories FIG. 13 shows an example dialogue within the Preferences module (170 in FIG. 2) in which a list of possible categories is presented for the customer to add and amend them as wished, including sub-categories. These are used, as discussed above to 'tag' transactions with specific names in order for them to have a clear picture of their spending habits. A category can have one or more sub-categories attached to it and both can also have specific attributes. Hence the customer can make their tracking as detailed as they wish.

Every real transaction can be categorised. This is predominantly a manual process. The customer can have any number of categories; for example a category may be FOOD. This category may then have any number of sub categories, for example sub categories of FOOD may be BUY-IN, EAT OUT, TAKE-AWAY. A category can also have attributes attached to it for example FOOD may have an attribute marking it as "Essential" or BUY-IN may have "Essential" with EAT OUT as "Non-essential".

At the outset the customer is provided with default list of categories. At this stage or at any point in the future the customer can choose to amend existing category names and attributes or add additional categories and sub categories. The customer can rename, divide and delete categories or sub-categories as wished.

Reporting

The improved account also allows for the customer to monitor financial matters by way of reporting functions.

For example, a customer may wish to analyse what has happened to their account and how they have arrived at a particular position. The customer can produce reports on the account by defining filtered views of transactions. For example, a category analysis report can be carried out for a particular date range, grouping transactions by a chosen category and displaying them graphically as part of a report. It is further possible to perform a category transaction report for a such a date range showing each transaction for each category, again with the ability to report these and display them graphically. Using such a data processing structure would also form the basis for calculations for producing a monthly trend analysis for each category.

Figure 14:
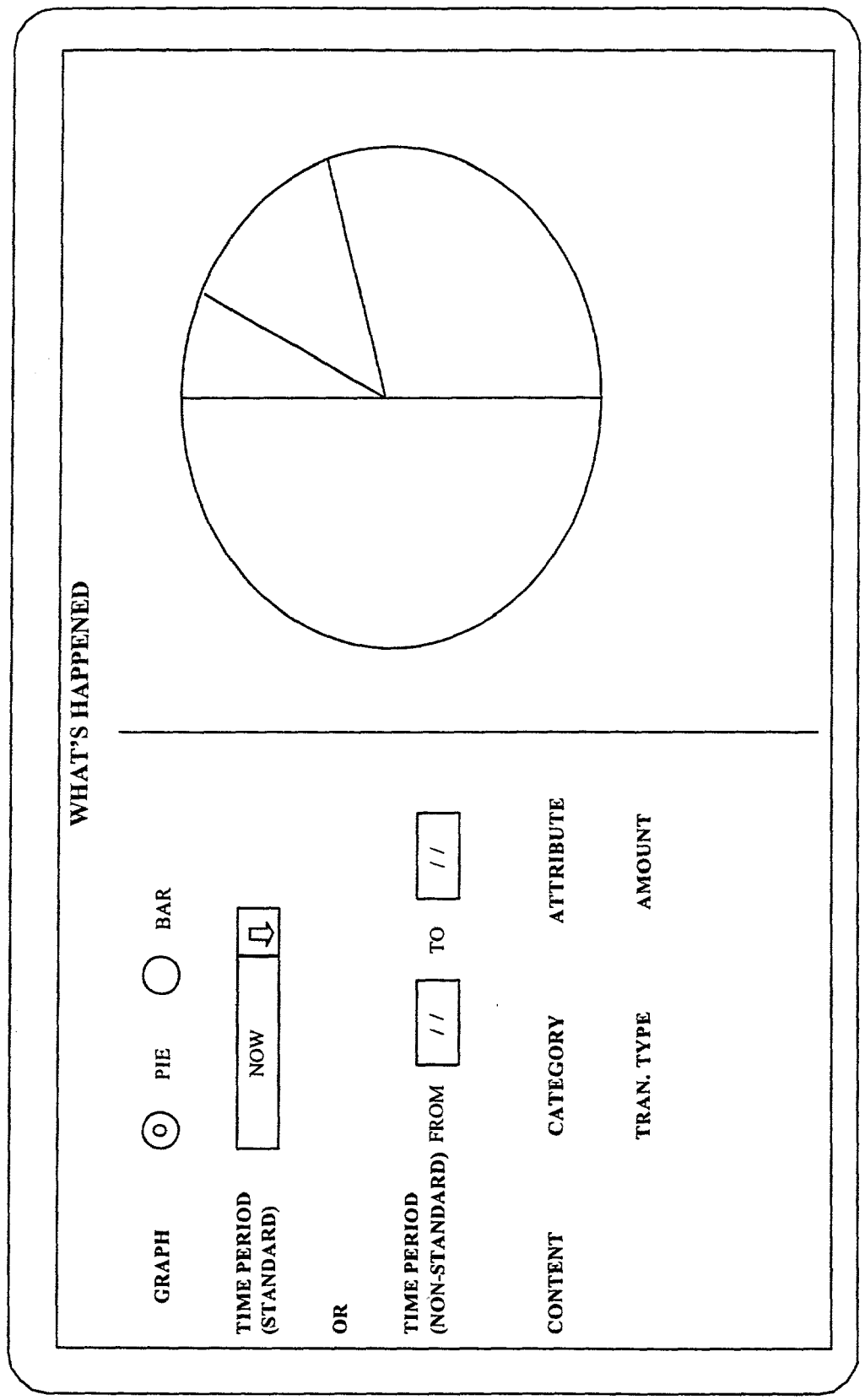

FIG. 14 shows an example report screen. This feature provides a reporting tool that allows the customer to see the movement within their account over various periods of time. Using various control fields and buttons, the customer could choose to view this information based on category/attribute, amount, transaction date, transaction type or even potentially real transaction against virtual. The customer can choose how the information will be displayed to them from a number of possible options for example as bar graph or pie chart.

The customer also has the option of the time period that they wish to interrogate, either from a standard list of timeframes or a defined 'non-standard' time period such as the previous 3 weeks, the previous week etc.

It is further possible to generate standard reports such as 'what I have spent?' and 'what is my annual view? The customer can further specify views such as spending per category.

Forecasting—"What-If" Function

The purpose of the "what if" tool is to enable customer to understand their current position and the effect that future actions will have on their overall repayment. This enables the customer to plan for events such as moving house and to analyse the positive and negative aspects of changing, for example, mortgage repayments. Further, such financial simulations can be scrutinised to high degree of detail using any of the previously described reporting functionality of the system.

Figure 15:
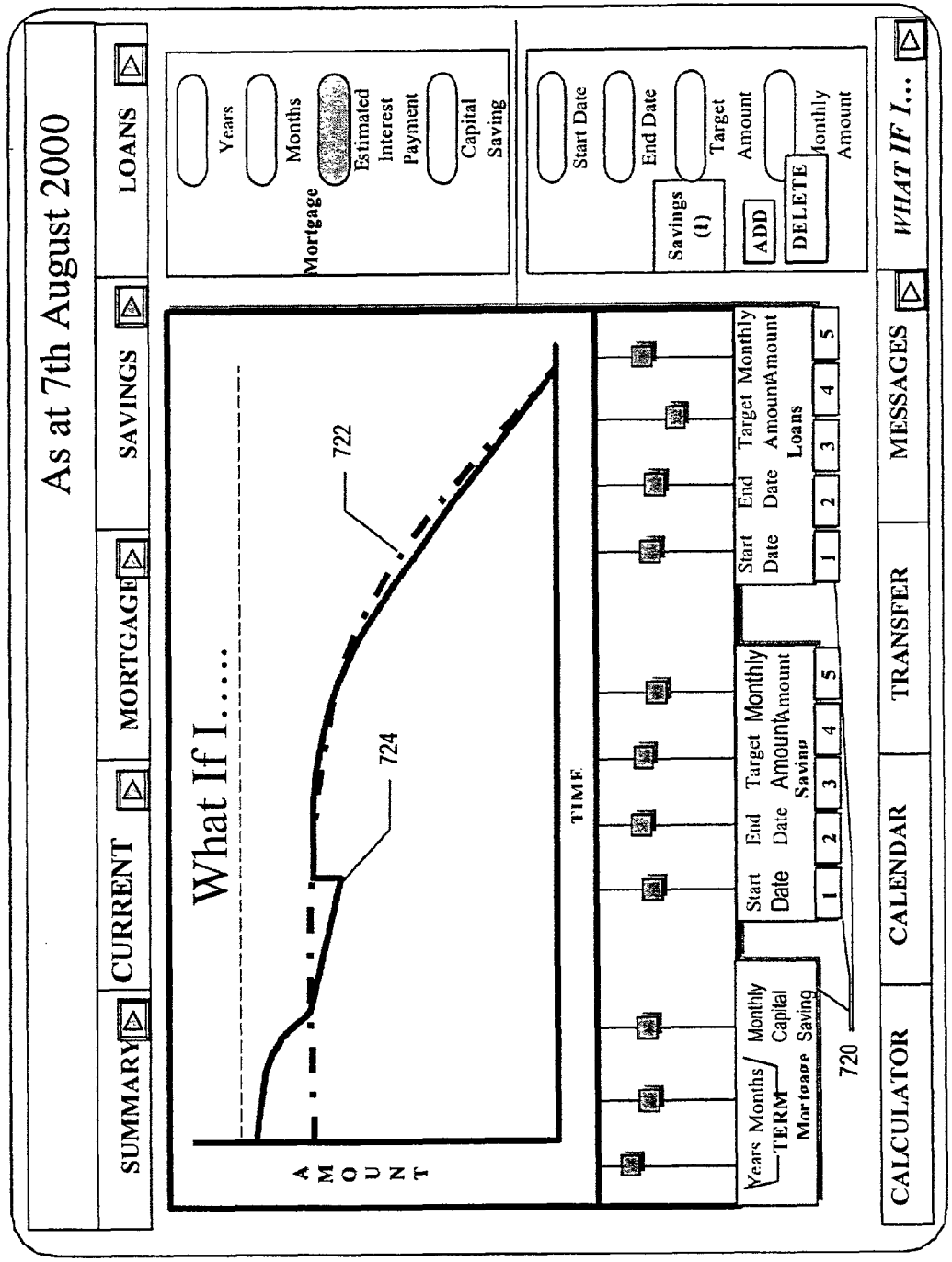
Figure 16:
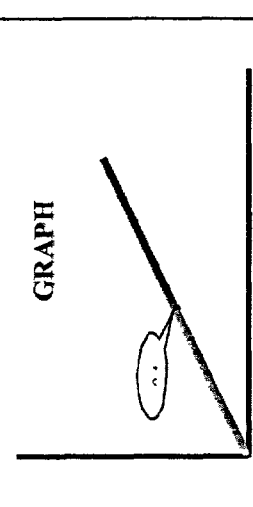

FIGS. 15 and 16 show example screens for the forecasting function, which is essentially an extension of the reporting function. As with the historical view of FIG. 14, the customer can define specific parameters and views of how the information should be displayed. The customer can define the timeframe that they wish to take into consideration.

For example, in FIG. 15 the repayment parameters 720 for the account have been modified and the results of this shown graphically, comparing the situation under the present parameters (722) with the new ones (724).

FIG. 16 shows an example of how this principle can be applied to a specific pot, in this example a car loan. The parameters of the loan can be adjusted to forecast how soon the loan may be paid off, shown graphically where the present payment scheme can be compared against another adjusted scheme.

For viewing the information the customer has standard graph choices. It is also possible for the customer to see their overall repayment plan taking into consideration all virtual pots currently in existence, with the possibility of simulating the creation of additional pots.

Calendar Function

FIG. 17 illustrates the calendar function (module 365 in FIG. 4) which provides the customer with a different picture on their finances. At the highest level it can provide a daily prompt of transactions through the account and the free cash available as at that day. The customer has the ability to record significant financial events on specific dates and for these to then produce warnings that the events are approaching, for example end of tax year returns for self employed customers and maturing endowments. The customer can also view past transactions on any particular day.

This functions by virtue of all transactions having dates attached to them. It is therefore possible for the customer to access the date on the calendar to view all transactions which took place. This therefore provides a full transaction history with the customer being able to access any date at any point in time. In the same way it is also be possible to provide a history of the free cash on any particular date.

Alerts Function

The facility to track events whether they are calendar-based or report-based also allows for the creation of an alerts by the system, drawing attention to particular events. Notification of such alerts could be through the use of on-screen messaging systems or other channels such as mobile telephony WAP/SMS systems.

Alerts can be set around specific pots, for example to advise when a target date has been reached or amounts over a certain size coming into or leaving the account. Alerts can also link in with the calendar to advise when specific financial events are approaching or have been reached, for example a self-employed person might require an alert around the time that their tax returns are due. Some alerts can also be triggered automatically where it is seen that the customer should be aware of certain events such as general interest rate increases, or an invitation to reduce your facility (for example to benefit from a reduced interest rate).

For receiving these alerts the customer can also specify communication methods. These could be via the online service itself or via WAP/SMS, email or a telephone call.

It is further possible to extend the functionality of the versatile integrated account by providing additional services. The system can make provision for the uploading and downloading of data to and from the customer. This would enable customers to import data into third party tools such as financial applications or spreadsheets. Such tools provide the facility to enable customers to download transactional information directly from online banking services in a compatible format such as the Open Financial Exchange (OFX) format. A download module 62 is shown in FIG. 4 for this purpose. This facility will allow customers to be able to download details of their physical transactions. This facility could also be used for local archival purposes controlled by the customer but based on a central database to allow access to information which could be stored for immediate retrieval or archived for storage.

The financial database module 370 (FIG. 4) can be used by the customer for storing data unrelated to the account itself, for ease of reference.

This application claims priority form UK 0112596.2 filed May 24, 2001 and form provisional US application number 60/382,603 filed May 24, 2002. The contents of each of these applications is incorporated herein by reference in their entirety.

The skilled reader will understand from the above description and drawing how to implement a system of apparatuses and automated processes enabling the provision of an improved financial management environment, particularly for personal banking. At the same time, it will be appreciated that the detailed embodiment is presented only as an example of such an implementation, and that many modifications and variations are possible within the spirit and scope of the invention.

APPENDIX

Details Of Algorithms For Processing Stages Portrayed In FIGS. 7A to 7D

CALCULATIONS FOR LOAN POTS:

Input loan pot details

| | |
|---|---|
| Loan_amount | = amount borrowed (input) |
| Interest_only_loan_amount | = interest only amount (input) |
| Loan_start_month_year | = loan start month and year (input) |
| Loan_end_month_year | = loan end month and year (input) |
| Debt_reduction_day | = day of month for debt reduction (input) |
| Current balance (display) | = Loan_amount |

APPENDIX-continued

Details Of Algorithms For Processing Stages Portrayed In FIGS. 7A to 7D

On logon

This_months_expected_total_capital_reduction = 0
Calculate monthly loan cost

| | |
|---|---|
| Current_interest_rate | = Current CMS interest rate for the account |
| Current_month_year | = The month and year from CMS sysdate (set to the first of the month) |
| Next_month_year | = The month and year from Current_month_year + 1 month (set to the first of the month) |
| Loan_end_month_year_plus_one | = Loan_end_month_year + 1 month (set to the first of the month) |

If Last_capital_change_month_year < Current_month_year
   Start_month_year = Current_month_year
Else
   Start_month_year = Next_month_year
End

| | |
|---|---|
| Remaining_exact_years | = CALC_REMAINING_EXACT_YEARS (Start_month_year, Loan_end_month_year_plus_one) |
| Monthly cost (display) | = CALC_MONTHLY_COST |
| Stored_previous_annuity | (Current_interest_rate, Loan_amount, Interest_only_loan_amount, Remaining_exact_years, 12) |

Store initial planned balance values

| | |
|---|---|
| Last_capital_change_month_year | = Loan_start_month_year − 1 month (set to the first of the month) |
| Stored_capital_planned_balance | = CALC_REPAYMENT_AMOUNT (Loan_amount, Interest_only_loan_amount) |

Check if there is any outstanding capital reduction due

| | |
|---|---|
| Current_interest_rate | = interest rate |
| Current_month_year | = The month and year from CMS sysdate (set to the first of the month) |
| Last_month_year | = The month and year from Current_month_year − 1 month (set to the first of the month) |
| Remaining_exact_years_one | = CALC_REMAINING_EXACT_YEARS (Last_capital_change_month_year, Loan_end_month_year) |
| Remaining_exact_years_two | = CALC_REMAINING_EXACT_YEARS (Last_month_year, Loan_end_month_year) |

If (Last_month_year > Last_capital_change_month_year) AND (Stored_capital_planned_balance >0)
   If Remaining_exact_years_two <= 0
      Outstanding_capital_reduction = Stored_capital_planned_balance
      Loan_end_month_year = Last_month_year
   Else
      Outstanding_capital_reduction = CALC_CAPITAL_REDUCTION
      $2^{nd}$ return not required (Current_interest_rate, Remaining_exact_years_one, Stored_capital_planned_balance, Remaining_exact_years_two, 12)
   End
End To process outstanding capital reduction If indicator for auto look after set to YES
   Outstanding_capital_planned_balance
      = Stored_capital_planned_balance − Outstanding_capital_reduction
   If Outstanding_capital_reduction > 0
      Current_pot_balance = Outstanding_capital_planned_balance + Interest_only_loan_amount
      Create the virtual transaction for the pot
   End
   Last_capital_change_month_year = Last_month_year
   Stored_capital_planned_balance = Outstanding_capital_planned_balance
   Store balance for graph (Current_month_year)
      = Current_pot_balance APPENDIX-continued Details Of Algorithms For Processing Stages Portrayed In FIGS. 7A to 7D

```
Else (indicator for auto look after set to NO)
    Store Outstanding_capital_reduction for the pot for Last_month_year
    (loan pot still has an outstanding payment due)
End
Check if any loan pots still have outstanding payment due.

For each loan with a payment due
    Outstanding capital reduction (display)           = Outstanding_capital_reduction for the pot
    Change Outstanding capital reduction (display)
    If Outstanding capital reduction (display)        > Stored_capital_planned_balance for the pot
        Outstanding capital reduction (display)                = Stored_capital_planned_balance for the pot
        End
    Outstanding_capital_reduction                     = Outstanding capital reduction (display)
    Outstanding capital_planned_balance
                                                      = Stored_capital_planned_balance −
                                                        Outstanding_capital_reduction
    If Outstanding_capital_reduction > 0
        Current_pot_balance                           = Outstanding_capital_planned_balance +
                                                        Interest_only_loan_amount
        Create the virtual transaction for the pot
    End
    Last_capital_change_month_year                    = Last_month_year
    Stored_capital_planned_balance                    = Outstanding_capital_planned_balance
    Store balance for graph (Last_month_year)
                                                      = Current_pot_balance
End
Calculate the capital reduction due this month (for a pot)

Current_interest_rate                                 = interest rate
Current_month_year                                    = The month and year from CMS sysdate
                                                        (set to the first of the month)
Next_month_year                                       = The month and year from
                                                        Current_month_year + 1 month
                                                        (set to the first of the month)
Loan_end_month_year_plus_one                          = Loan_end_month_year + 1 month
                                                        (set to the first of the month)
Remaining_exact_years_one                             = CALC_REMAINING_EXACT_YEARS
                                                        (Current_month_year,
                                                        Loan_end_month_year_plus_one)
Remaining_exact_years_two                             = CALC_REMAINING_EXACT_YEARS
                                                        (Next_month_year,
                                                        Loan_end_month_year_plus_one)
If (Current_month_year > Last_capital_change_month_year)
   AND (Current_month_year >= Loan_start_month_year)
   AND (Current_month_year <= Loan_end_month_year)
   AND (Stored_capital_planned_balance >0)
    If Remaining_exact_years_two                      <= 0
        This_months_capital_reduction                 = Stored_capital_planned_balance
    Else
        This_months_capital_reduction                 = CALC_CAPITAL_REDUCTION
        2nd return not required                         (Current_interest_rate,
        Remaining_exact_years_one,
           Stored_capital_planned_balance,
                                                        Remaining_exact_years_two,
    End                                                 12)
End
To process this months capital reduction If the capital reduction is due (day of month for debt reduction <= todays date)
    If indicator for auto look after set to YES
        This_months_capital_planned_balance
                                                      = Stored_capital_planned_balance −
                                                        This_months_capital_reduction
        If This_months_capital_reduction > 0
            Current_pot_balance                       = This_months_capital_planned_balance +
                                                        Interest_only_loan_amount
            Create the virtual transaction for the pot
        End
        Last_capital_change_month_year                = Current_month_year
        Stored_capital_planned_balance                = This_months_capital_planned_balance
        Store balance for graph (Current_month_year)
                                                      = Current_pot_balance
    Else (indicator for auto look after set to NO)
        Store This_months_capital_reduction for the pot for Current_month_year
        (loan pot still has this months payment due)
```

APPENDIX-continued

Details Of Algorithms For Processing Stages Portrayed In FIGS. 7A to 7D

| | |
|---|---|
| Else (capital reduction due later this month) | |
|    This_months_expected_total_capital_reduction | = This_months_expected_total_capital_reduction + This_months_capital_reduction |
|    Store balance for graph (Current_month_year) | = Current_pot_balance − This_months_capital_reduction |
| End | |

Check if any loan pots still have this months payment due.

| | |
|---|---|
| For each loan with a payment due | |
|    This months capital reduction (display) | = This_months_capital_reduction for the pot |
|    Change This months capital reduction (display) | |
|    If This months capital reduction (display) | > Stored_capital_planned_balance for the pot |
|      This months capital reduction (display) | = Stored_capital_planned_balance for the pot |
|    End | |
|    This_months_capital_reduction | = This months capital reduction (display) |
|    This_months_capital_planned_balance | = Stored_capital_planned_balance − This_months_capital_reduction |
|    If This_months_capital_reduction > 0 | |
|      Current_pot_balance | = This_months_capital_planned_balance + Interest_only_loan_amount |
|      Create the virtual transaction for the pot | |
|    End | |
|    Last_capital_change_month_year | = Current_month_year |
|    Stored_capital_planned_balance | = This_months_capital_planned_balance |
|    Store balance for graph (Current_month_year) | = Current_pot_balance |
| End | |

Calculate the future monthly planned balances

| | |
|---|---|
| Current_interest_rate | = Current CMS interest rate for the account |
| Current_month_year | = The month and year from CMS sysdate (set to the first of the month) |
| Previous_month_year | = Current_month_year |
| Month_year | = The month and year from Current_month_year + 1 month (set to the first of the month) |
| Previous_capital_balance | = Stored_capital_planned_balance |
| If (Loan_end_month_year > Current_month_year) | |
|    Do while Month_year <= Loan_end_month_year | |
|      Remaining_exact_years_one CALC_REMAINING_EXACT_YEARS | = (Previous_month_year, Loan_end_month_year) |
|      Remaining_exact_years_two CALC_REMAINING_EXACT_YEARS | = (Month_year, Loan_end_month_year) |
|      If Remaining_exact_years_two | <= 0 |
|        Month_year_capital_planned_balance | = 0 |
|      Else | |
|        1st return not required =CALC_CAPITAL_REDUCTION | |
|        Month_year_capital_planned_balance | (Current_interest_rate, Remaining_exact_years_one, Previous_capital_balance, Remaining_exact_years_two, 12) |
|      End | |
|      Month_year_planned_balance | = Month_year_capital_planned_balance + Interest_only_loan_amount |
|      Store Month_year_planned_balance for Month_year for graph | |
|      Previous_capital_balance | = Month_year_capital_planned_balance |
|        Previous_month_year | = Month_year |
|      Month_year | = The month and year from Month_year + 1 month (set to the first of the month) |
|    End | |
| End | |

INITIAL CALCULATIONS - Higher level functions

CALC_MONTHLY_COST

| | |
|---|---|
| INPUT | |
| In_nominal_interest_rate | number (4) |
| In_loan_amount | number (9,2) |
| In_interest_only_loan_amount | number (9,2) |

APPENDIX-continued

Details Of Algorithms For Processing Stages Portrayed In FIGS. 7A to 7D

| | |
|---|---|
| In_remaining_exact_years | number (3,5) |
| In_interest_apps | number (3) |
| OUTPUT | |
| Returned_monthly_cost | number (8,2) |
| Returned_annuity | number (3,9) |
| Capital_repayment_amount | =CALC_REPAYMENT_AMOUNT (In_loan_amount, In_interest_only_loan_amount) |
| EAR | = CALC_EAR (In_nominal_interest_rate, In_interest_apps) |
| Discounted_rate | = CALC_DISCOUNTED_RATE (EAR) |
| Annuity | = CALC_ANNUITY (Discounted_rate, In_remaining_exact_years, In_nominal_interest_rate) |
| Repayment_monthly_cost | = CALC_REPAYMENT_COST (In_interest_apps, Capital_repayment_amount, Annuity) |
| Interestonly_monthly_cost | = CALC_INTEREST_COST (In_interest_apps, In_Interest_only_loan_amount, In_nominal_interest_rate) |
| Monthly_cost | =CALC_TOTAL_COST (Repayment_monthly_cost, Interestonly_monthly_cost) |

CALC_REMAINING_EXACT_YEARS

| | |
|---|---|
| INPUT | |
| In_current_month_year | date |
| In_loan_end_month_year | date |
| OUTPUT | |
| Returned_remainin a exact_years | number (3,5) |
| Number_of months | = Months between (In_current_month_year, In_loan_end_month_year) |
| Remaining_exact_years | = Number_of_months / 12 |

CALC_CAPITAL_REDUCTION

| | |
|---|---|
| INPUT | |
| In_nominal_interest_rate | number (4) |
| In_remaining_exact_years_one | number (3,5) |
| In_capital_planned_balance_one | number (9,2) |
| In_remaining_exact_years_two | number (3,5) |
| In_interest_apps | number (3) |
| OUTPUT | |
| Returned_capital_reduction | number (9,2) |
| Returned_capital_planned_balance_two | number (9,2) |
| EAR | = CALC_EAR (In_nominal_interest_rate, In_interest_apps) |
| Discounted_rate | = CALC_DISCOUNTED_RATE (EAR) |
| Annuity_one | = CALC_ANNUITY (Discounted_rate, In_remaining_exact_years_one, In_nominal_interest_rate) |
| Annuity_two | = CALC_ANNUITY (Discounted_rate, In_remaining_exact_years_two, In_nominal_interest_rate) |
| Capital_planned_balance_two | = CALC_OUTSTANDING_BALANCE (Annuity_one, Annuity_two, In_capital_planned_balance_one) |
| Capital_reduction | = CALC_REMAINING_AMOUNT (In_capital_planned_balance_one, Capital_planned_balance_two) |

INITIAL CALCULATIONS - Elementary Functions

CALC_REPAYMENT_AMOUNT

| | |
|---|---|
| INPUT | |
| In_mortgage_amount | number (9, 2) |
| In_interest_only_amount | number (9, 2) |
| OUTPUT | |
| Return In_mortgage_amount – In_interest_only_amount | number (9, 2) |

CALC_EAR

| | |
|---|---|
| INPUT | |
| In_nominal_rate | number(1,5) |
| In_interest_apps | number(3) |
| OUTPUT | |
| Return $((1+(In\_nominal\_rate/In\_interest\_apps))^{In\_interest\_apps})-1$ | number(1,9) |

CALC_DISCOUNTED_RATE

| | |
|---|---|
| INPUT | |
| In_ear | number(1,9) |
| OUTPUT | |
| Return (1/(1+in_ear)) | number(1,9) |

CALC_ANNUITY

| | |
|---|---|
| INPUT | |
| In_discounted_rate | number(3,9) |
| In_term (exact years) | number(3,5) |
| In_nominal_rate | number(1,5) |

APPENDIX-continued

Details Of Algorithms For Processing Stages Portrayed In FIGS. 7A to 7D

OUTPUT
Return (1− In_discounted_rate^ In_term) / In_nominal_rate   number(3,9)
- check for divide by zero
CALC_REPAYMENT_COST INPUT
In_interest_apps                                 number(3)
In_repayment_amount                              number (9,2)
In_annuity                                       number(3,9)
OUTPUT
Return in_repayment_amount/ in_annuity/ In_interest_apps   number (7,2) rounded up to 2d.p.
check for divide by zero
CALC_INTEREST_COST INPUT
In_interest_apps                                 number (3)
In_interest_only_amount                          number (9,2)
In_nominal_rate                                  number (3,5)
OUTPUT
Return in_interest_only_amount * (in_nominal_rate / in_interest_apps)
                                                 number (7,2) rounded up to 2d.p.
CALC_TOTAL_COST INPUT
In_repayment_cost                                number (7,2)
In_interest_cost                                 number (7,2)
OUTPUT
Return In_repayment_cost + In_interest_cost      number (8,2)
CALC_OUTSTANDING_BALANCE INPUT
In_annuity(at start)                             number (3,9)
In_annuity(now)                                  number (3,9)
In_balance(at start)                             number (9,2)
OUTPUT
Return (In_annuity(now)/In_annuity(at start))*In_balance(at start)   number (9,2)
CALC_REMAINING_AMOUNT INPUT
In_amount_one                                    number (9,2)
In_amount_two                                    number (9,2)
OUTPUT
Return In_amount_one − In_amount_two             number (9,2)
CALC_PLANNED_BALANCE INPUT
In_amount_one                                    number (9,2)
In_amount_two                                    number (9,2)
OUTPUT
Return In_amount_one + In_amount_two             number (9,2)

CALCULATIONS for SAVINGS POTS

Input savings pot details

Target_amount                            = savings target amount (input)
Savings_start_month_year = savings start month and year (input)
Savings_end_month_year                   = savings end month and year (input)
Savings_monthly_amount                   = savings monthly amount (input)
Savings_transaction_day                  = savings transaction day (input)
Current balance (display)= 0
Current_month_year                       = The month and year from CMS sysdate
                                         (set to the first of the month)
Number_of_months_remaining               = Months between (Current_month_year, Savings_end_month_year)
CALCULATE MONTHLY AMOUNT Savings_monthly_amount                   = (Target_amount − Current balance)/
Number_of_months_remaining
Rounded up 9,2
CALCULATE NEW SAVINGS END MONTH YEAR Number_of months_remaining               = (Target_amount − Current balance) / Savings_monthly_amount −
                                         This_months_expected_savings
Savings_end_month_year                   = Current_month_year + Number_of months_remaining
CALCULATE NEW TARGET Target_amount                            = Number_of_months_remaining * Savings_monthly_amount +
Rounded down 9,2                         Current balance

The invention claimed is:

1. A non-transitory computer-readable record carrier comprising computer-readable program steps which when executed by at least one computer cause the at least one computer to perform a method for implementing integrated bank accounts for a plurality of customers, each integrated bank account combining the features of (i) a loan secured against an asset of the customer and (ii) a checking account, whereby the customer's day-to-day credit and debit transactions are aggregated with the loan into a single account balance with a single credit limit, said method comprising:

receiving from the customer instructions for credit and debit transactions and effecting real transactions by communication with apparatuses of a plurality of banking institutions;

periodically updating said single account balance, interest deductions and available credit in response to said real transactions;

reporting to the customer the single account balance and transaction history;

in responsive to secondary customer instructions, creating a sub-account database defining attributes and virtual balances for a plurality of virtual sub-accounts of said loan and checking account parts of the single account so as to compartmentalize funds within said single account balance and credit limit without creating separate accounts in an account operation apparatus;

effecting virtual transactions between said sub-accounts without effecting any real transaction or altering the single account balance; and updating and reporting sub-account balances in response to each said virtual transaction.

2. The non-transitory computer-readable record carrier as claimed in claim 1 wherein the sub-accounts include a virtual checking account whose balance is said single account balance minus the other virtual sub-account balances.

3. The non-transitory computer-readable record carrier as claimed in claim 1 wherein the secondary customer interface is used in financial planning and arranged to present all real transactions, as transactions with said virtual checking account.

4. The non-transitory computer-readable record carrier as claimed in claim 1 wherein the real transaction engine is operable to create regular and ad hoc transactions according to said customer instructions.

5. The non-transitory computer-readable record carrier as claimed in claim 1 wherein the virtual transaction engine includes an automatic virtual transaction generator configured to generate transactions at intervals, in accordance with sub-account parameters defined by the secondary customer instructions.

6. The non-transitory computer-readable record carrier as claimed in claim 1 wherein said sub account creating engine is operable to create a loan-type sub-account, the virtual transaction engine being arranged to generate virtual transactions automatically so as to "repay" the loan-type sub-account over a period of time.

7. The non-transitory computer-readable record carrier as claimed in claim 1 wherein the virtual transaction engine is operable to associate portions of the interest deductions of the single account with a loan-type sub-account, thereby to present interest deductions as virtual transactions with said sub-account.

8. The non-transitory computer-readable record carrier as claimed in claim 1 where the sub account creating engine is operable to create a savings-type sub-account, the virtual transaction engine being arranged to generate virtual transactions automatically so as to transfer funds from another sub-account into said savings-type sub-account over a period of time.

9. The non-transitory computer-readable record carrier as claimed in claim 1 wherein the virtual transaction engine is arranged to operate only in response to customer activation of said secondary customer interface.

10. The non-transitory computer-readable record carrier as claimed in claim 1 wherein the virtual accounting engine is arranged to update the balances of all sub-accounts before allowing access to functions for the creation and/or modification of sub-accounts.

11. The non-transitory computer-readable record carrier as claimed in claim 1 wherein the virtual accounting engine includes a calculator configured to calculate and report projected sub-account balances at a future date, by reference to a database of expected virtual transactions.

12. The non-transitory computer-readable record carrier as claimed in claim 11 wherein the calculator is operable to report on the effect of hypothetical changes in attributes of the sub-accounts.

13. The non-transitory computer-readable record carrier as claimed in claim 1 wherein said account operation apparatus and said secondary customer interface are implemented on independent computer systems.

14. The non-transitory computer-readable record carrier as claimed in claim 1 wherein the real transaction engine and the secondary customer interface include a connection engine configured to establish a secure connection with a customer's own terminal over a public telecommunications network.

15. The non-transitory computer-readable record carrier as claimed in claim 1 wherein the sub-account database is maintained on a customer's own terminal, such as a personal computer or PDA.

16. The non-transitory computer-readable record carrier as claimed in claim 1 wherein sub-account databases for said plurality of customers are maintained on a central server apparatus.

17. The non-transitory computer-readable record carrier as claimed in claim 16 wherein the customer's own terminal merely handles instructions and reporting functions, the virtual transactions being implemented on the sub-account database remote from the customer.

18. The non-transitory computer-readable record carrier as claimed in claim 1 wherein the secondary customer interface is controlled by an intermediate service provider separate from the banking institution controlling the account operating apparatus.

19. A non-transitory computer-readable record carrier comprising computer-readable program steps which when executed by at least one computer cause the at least one computer to perform a method for implementing an integrated bank account, the integrated bank account combining the features of (i) a loan and (ii) a checking account, whereby a customer's day-to-day credit and debit transactions are aggregated with the loan into a single account balance with a single credit limit, said method comprising:

receiving from the customer instructions for credit and debit transactions and effecting real transactions by communication with apparatuses of a plurality of banking institutions;

periodically updating said single account balance, interest deductions and available credit in response to said real transactions;

reporting to the customer the single account balance and transaction history;

in responsive to secondary customer instructions, creating virtual sub-accounts, and a sub-account database defining attributes and virtual balances, for the plurality of virtual sub-accounts of said loan and checking account parts of the single account so as to compartmentalize funds within said single account balance and credit limit without creating separate accounts in an account operation apparatus;

effecting virtual transactions between said sub-accounts without effecting any real transaction or altering the single account balance; and updating and reporting sub-account balances in response to each said virtual transaction.

20. A non-transitory computer-readable record carrier comprising computer-readable program steps which when executed by at least one computer cause the at least one computer to perform a method for implementing an integrated bank account, the integrated bank account combining the features of (i) a loan and (ii) a checking account, whereby a customer's day-to-day credit and debit transactions are aggregated with the loan into a single account balance with a single credit limit, said method comprising:

receiving from the customer instructions for credit and debit transactions and effecting said transactions by communication with apparatuses of a plurality of banking institutions;

periodically updating said single account balance, interest deductions and available credit in response to said received credit and debit transactions;

reporting to the customer the single account balance and transaction history;

in responsive to customer instructions, creating a plurality of sub-accounts, and a sub-account database defining attributes and balances of the plurality of sub-accounts, of said loan and checking account parts of the single account so as to compartmentalize funds within said single account balance and single credit limit without creating separate accounts in an account operation apparatus;

effecting transactions between said sub-accounts without altering the single account balance; and updating and reporting sub-account balances in response to each said transaction between sub-accounts.

21. A non-transitory computer-readable record carrier comprising computer-readable program steps which when executed by at least one computer cause the at least one computer to perform a method for implementing an account having a single line of credit limit, said method comprising:

receiving from a customer instructions for transactions and effecting said transactions by communication with apparatuses of a plurality of banking institutions;

periodically updating the balance of the account, interest deductions and available credit in response to said transactions;

reporting to the customer the single account balance and transaction history;

in responsive to customer instructions, creating a plurality of sub-accounts, and a sub-account database defining attributes and balances of the plurality of sub-accounts, of a loan and checking account parts of the single account so as to compartmentalize funds within said account balance and single credit limit without creating separate accounts in an account operation apparatus;

effecting transactions between said sub-accounts without altering the single account balance; and updating and reporting sub-account balances in response to each said transaction between sub-accounts.

* * * * *